(12) United States Patent
Takai et al.

(10) Patent No.: US 7,981,570 B2
(45) Date of Patent: Jul. 19, 2011

(54) FUEL CELL

(75) Inventors: Takahiro Takai, Wako (JP); Masao Utsunomiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/579,520

(22) Filed: Oct. 15, 2009

(65) Prior Publication Data

US 2010/0098986 A1 Apr. 22, 2010

Related U.S. Application Data

(62) Division of application No. 11/019,563, filed on Dec. 23, 2004, now abandoned.

(30) Foreign Application Priority Data

Dec. 24, 2003 (JP) .................. 2003-426327
Feb. 4, 2004 (JP) .................. 2004-027827
Feb. 24, 2004 (JP) .................. 2004-048162

(51) Int. Cl.
*H01M 4/64* (2006.01)

(52) U.S. Cl. ...................... 429/517; 429/518

(58) Field of Classification Search .................. 429/457, 429/456, 461, 517, 518
See application file for complete search history.

(56) References Cited

U.S. PATENT DOCUMENTS 5,643,690 A 7/1997 Tateishi et al.

FOREIGN PATENT DOCUMENTS

| JP | 07230818 A | 8/1995 |
| JP | 08180883 A | 7/1996 |
| JP | 2001297784 A | 10/2001 |
| JP | 2002270196 A | 9/2002 |
| JP | 2003123783 A | 4/2003 |

*Primary Examiner* — Helen O Conley
(74) *Attorney, Agent, or Firm* — Arent Fox, LLP

(57) ABSTRACT

The present invention provides a fuel cell having a layered structure, including: a membrane electrode assembly having a fuel electrode, an oxidation electrode, and an electrolyte membrane held between the fuel electrode and the oxidation electrode; and stainless steel separators holding the membrane electrode assembly therebetween. The stainless steel separator contains Cr and Fe; the Cr concentration by mass % by mass ratio of Cr to Fe at the separator surface facing the fuel electrode is from 0.7 to 1.3; and the Cr concentration by mass % by mass ratio of Cr to Fe at the separator surface facing the oxidation electrode is less than 0.7.

3 Claims, 7 Drawing Sheets

Fuel electrode side separator surface

Oxidation electrode side separator surface

Power generation face

Cooling medium face

FUEL CELL

CROSS REFERENCE TO RELATED APPLICATION

This is a Divisional Application, which claims the benefit of U.S. patent application Ser. No. 11/019,563, which claims priority of Japanese Patent Application No. 2003-426327, filed Dec. 24, 2003; Japanese Patent Application No. 2004-027827, filed Feb. 4, 2004 and Japanese Patent Application No. 2004-048162, filed Feb. 24, 2004. The disclosures of the prior applications are hereby incorporated herein in their entirety by reference.

BACKGROUND OF THE INVENTION

1. Field of the Invention

The present invention relates to a fuel cell, and in particular relates to a solid polymer electrolyte fuel cell.

2. Description of the Related Art

In a fuel cell in which a polymer electrolyte is used, electric power and heat are simultaneously generated by an electrochemical reaction of a fuel gas containing hydrogen gas and an oxidizing gas containing oxygen gas or air. The fuel cell basically has a polymer electrolyte membrane for selectively transporting hydrogen ions, and a pair of electrodes, that is, an anode electrode and a cathode electrode formed on both surfaces of the polymer electrolyte membrane. The electrode generally consists of a catalytic layer formed on a surface of the polymer electrolyte membrane layer and a gas-diffusion layer formed on an outside surface of the catalyst layer. The catalyst layer is mainly composed of a carbon powder supporting a platinum group metal catalyst. The gas-diffusion layer has a gas permeability and an electrical conductivity. In order to prevent leakage of the fuel gas and the oxidizing gas and mixing thereof externally, a gas seal member or a gasket is provided at the circumference of the electrode such that a polymer electrolyte membrane is held therebetween. The gas seal member or the gasket is assembled beforehand so as to be integrated with the polymer electrolyte membrane and the electrode. The assembly is referred to as a "Membrane Electrode Assembly" (hereinafter referred to simply as "MEA"). A conductive separator is disposed outside the MEA so as to mechanically secure MEA and electrically connect the adjacent MEAs in series or in parallel. A gas passage is formed at a contacting portion of the separator with the MEA for supplying reaction gases to an electrode surface and for collecting generated gases and excess gases. The gas passage can be provided separately from the separator. Generally, the separator has grooves as gas passages provided on a surface thereof.

In order to supply a fuel gas or an oxidizing gas to the above grooves, a pipe jig is required so as to branch pipes at the number of separators used and to directly connect the branched ends of the pipes to the grooves of the separators. The jig is referred to as a "manifold". In particular, a type of manifold directly connecting a supply pipe of the above fuel gas or the above oxidizing gas is referred to as an "external manifold". A type of manifold having a more compact design is referred to as an "internal manifold". The internal manifold is constructed such that a through hole is provided to penetrate a separator in which gas passages are formed, an outlet and an inlet are communicated with the though hole, and a fuel gas or an oxidizing gas is directly supplied from the through hole. Since a fuel cell generates heat in operation, the fuel cell is required to be cooled by using cooling water, etc., so as to maintain desirable temperature conditions. In general, a cooling portion for flowing the cooling water at every one to three cells is provided so as to cool a fuel cell. There is a type of cooling portion disposed between adjacent separators and there is a type of cooling portion having a cooling water passage at a back surface of a separator. In particular, the latter type of the cooling portion is widely used.

A common stacked fuel cell is constructed such that a layered structure having 10 to 200 cells is produced by alternately layering MEAs, separators and cooling portions. The layered structure is held by end plates via a collecting plate and an insulating plate, and both ends of the end plates are fixed with fastening bolts. In the polymer electrolyte fuel cell, it is necessary that the separator have high conductivity, high air-tightness with respect to a fuel gas and an oxidizing gas, and high corrosion resistance in reactions of oxidizing or reducing hydrogen gas or oxygen gas. For this reason, a conventional separator was commonly composed of a carbon material such as a glassy carbon or an expansion carbon. Gas passages were produced by machining a surface thereof. In the case of the expansion carbon, gas passages were produced by forming with a mold. However, in the case of using the above materials, a process is used in which the above materials have high density in order to prevent gas leaks. Since the above materials are brittle, it is difficult to work the above materials, and the working cost is thereby increased. These problems have contributed to the high cost of fuel cells.

In recent years, in order to reduce this cost, various techniques for fuel cells were proposed. For example, a technique was proposed in Japanese Unexamined Patent Application Publication No. 8-180883, in which a separator is obtained by pressing or punching working on a metal plate as a separator material. However, in the case of obtaining the separator by performing only the above working method, collecting resistance of the fuel cell is increased due to corrosion of the separator, and durability thereof is decreased.

In order to solve the above problems, a conductive separator plate was proposed in Japanese Unexamined Patent Application Publication No. 2002-270196, in which a conductive separator plate is composed of a stainless steel having a corrugated surface, and a surface thereof is covered with a passivation film including enriched Cr. However, in the technique in which the concentration of Cr at the surface of the above stainless steel is enriched, a hard passivation film is formed not only on a surface of a separator opposite to a fuel electrode (hereinafter referred to as "fuel electrode side separator") but also on a surface of a separator opposite to an oxidation electrode (hereinafter referred to as "oxidation electrode side separator") although oxidation resistance is sufficiently obtained, and contact resistance of the separator with a MEA is thereby excessively increased. Due to this, good output performance of the fuel cell cannot be obtained in initial performance.

A technique was proposed in Japanese Unexamined Patent Application Publication No. 2003-123783, in which a surface of an oxidation side separator is roughened and a passivation film is then formed, although concentration of Cr is not limited. However, in this technique, since a passivation film made of TiN, etc., is formed on a surface of the oxidation side separator, working cost is increased. Due to the above various problems in the conventional techniques, in particular, it is required to prevent a decrease in durability due to corrosion of the separator and a decrease in output performance due to excessive increase in contact resistance of the separator with the MEA.

In polymer electrolyte fuel cells, a cooling medium is circulated in a fuel cell in order to dissipate heat generated by electrochemical reactions. A cooling medium passage, in which through holes having the same shape are formed at the corresponding positions on layered surfaces of an anode separator and a cathode separator, is used as a circulating means of a cooling medium in a layered structure in which a unit fuel cell (hereinafter referred to as a "cell") are layered. In this way, a potential difference is generated among the above though holes and the respective cooling medium passages provided on a separator surface or among cooling medium passages of the respective separators. Due to this, short circuits may occur between separators holding a membrane electrode assembly (hereinafter referred to as "MEA"), and an electrical insulation property is required of the separator. A good insulating characteristic and a wide range temperature region (about −30 degrees C. to 150 degrees C.) are required for using the cooling medium. In particular, in fuel cells for automobiles, a pure water diluent such as an ethylene glycol is used in view of antifreeze characteristics, although it is desirable to use pure water.

In the above fuel cell technique, for example, a method is disclosed in Japanese Unexamined Patent Application Publication No. 7-230818, in which in order to secure an insulation property of a cooling medium of a solid polymer electrolyte fuel cell, after anode separators and cathode separators are stacked to obtain a stacked structure, a film forming material (sol in which tetraethoxysilane is hydrolyzed) is poured into a cooling medium passage and a though hole, and is adhered to surfaces thereof, so that a film is formed thereon. However, in the above technique, when a film is formed on the cooling medium passage by a sol-gel method, a hardening reaction occurs due to heating nitrogen gas, and growth of grains of the film is insufficient, whereby it is difficult to harden the film sufficiently. The heating temperature may be increased in order to improve hardening reaction of the film, but the separator may be deformed or deteriorated in this case.

It is necessary to use a heat exchanger such as a radiator which has a highly efficient cooling performance for cooling a fuel cell since the cooling medium is heated to 80 to 100 degrees C. in a solid polymer electrolyte fuel cell. In a conventional fuel cell system, in order to prevent formation of a short circuit via the cooling medium, a two-step cooling method is used in which the cooling medium supplied to an inside of a fuel cell stack is cooled by using a long life coolant circulating system (radiator cooling) via a counter-flow cooling apparatus. In particular, in metal separators, since contamination by impurity ions into the cooling medium possibly occurs due to the corrosion of the separator, it is necessary to control the conductivity thereof via an ion-exchange resin when the fuel cell is mounted in an automobile. Due to this, the system is complicated and is large, so that development of a one-step cooling system having good efficiency was required. However, in order to realize the one-step cooling system, it is necessary that the cooling medium circulation system be subjected to insulation coating treatment in order to prevent formation of the above short circuit and liquid junctions. When a film forming means by common insulating coating or common sol-gel method is used as the above coating treatment, heat conductivity of the separator is not sufficiently obtained, and heat exchange efficiency of the separator is decreased.

In the case in which a cooling medium surface is covered with a insulating coating, when the overall cooling medium surface is covered therewith, electrical conduction is prevented in a fuel cell layered direction. Due to this, in order to decrease electrical resistance as much as possible and to improve efficiency of the fuel cell, it is desirable that only the portion of the cooling medium surface which the cooling medium contacts be covered with insulating coating. However, in the case in which only the cooling medium passage is covered with the insulating coating, the separator is expensive.

In addition, for example, another method was proposed in Japanese Unexamined Patent Application Publication No. 2001-297784, in which a special material is disposed at a portion which contacts cooling water which circulates in a cell. In the material, ions in the cooling water are absorbed or discharged while applying voltage thereto, and voltage generated in the layered cell is applied thereto, so that there is a small potential difference between the cooling water and the cell in contact therewith, and component materials of the separator, etc., are not released and corroded in the cooling water. However, in the above technique, the apparatus has a complicated structure, and it is necessary to use expensive members. As a surface treating method in which stainless steel is used for a separator, a technique was proposed in Japanese Unexamined Patent Application Publication No. 2002-270196, in which a passivation film covering a surface of a stainless steel plate is controlled so as to contain Cr at 25 to 80 mass %. However, the above technique is related to a fuel gas passage and an oxidizing gas passage formed on a power generation surface of the separator, and thereby does not correspond to a cooling medium passage formed on a cooling medium surface of the separator.

SUMMARY OF THE INVENTION

The present invention was made in consideration of the above problems, and an object of the present invention is to provide a fuel cell which can prevent a decrease in durability due to corrosion of a separator in a use environment and a decrease in output performance due to excessive increase in contact resistance of a separator with a MEA.

An object of the present invention according to another aspect of the invention is to provide a fuel cell which can improve efficiency thereof by inhibiting an increase in electrical resistance in a fuel cell layering direction as long as possible, and which can inhibit corrosion of a separator material on a surface of a cooling medium and a contamination of the cooling medium due to a leak of impurity metal ions, and can improve durability of a cooling medium surface.

An object of the present invention according to another aspect of the invention is to provide a technique which can prevent a contamination of a cooling medium due to corrosion of a fuel cell and formation of a short circuit due to the contamination without decrease in cooling effect and increase in cost.

One of the reasons for decrease in durability of a fuel cell integrated with a stainless steel separator is a contamination of an electrode catalyst and an ion-exchange membrane due to impurity metal ions released from a stainless steel separator. That is, when impurity ion metal ions are released from a separator surface contacting an acid solution, the electrolyte catalyst and the ion-exchange membrane are contaminated, so that durability is decreased due to increase in collecting resistance. The inventors produced a fuel cell integrated with conventional stainless steel separators, and researched contact resistances of the separators with a MEA and surface characteristics before and after a predetermined period of power generation regarding both a fuel electrode side separator and an oxidation electrode side separator. The contact resistances of both electrode sides separator before and after power generation are shown in Table 1.

TABLE 1

|  | Contact resistance before power generation | UNIT: mΩ · cm$^2$<br>Contact resistance after power generation |
|---|---|---|
| Fuel electrode side separator surface | 6 | 6 |
| Oxidation electrode side separator | 6 | 6 |

As shown in Table 1, it is confirmed that contact resistances of the fuel electrode side separator and the oxidation electrode side separator before and after power generation does not increase. The surface characteristics of respective separators before and after power generation were observed by an electron microscope. The results are shown in FIGS. 1A and 1B. As shown in FIGS. 1A and 1B, facets as marks of metal release are confirmed to exist on the fuel electrode side separator, and the facets are not observed on the oxidation electrode side separator. The reason is as follows. That is, passivation films are not grown on a fuel electrode side separator surface since the fuel electrode side separator surface is under a reducing atmosphere with hydrogen. Impurity metal ions are easily released since the fuel electrode side separator is disposed in a potential approximate to an activating releasing potential of a stainless steel. In contrast, a passivation film is basically grown on the oxidation electrode side separator surface since the oxidation electrode side separator surface is under an oxidation atmosphere with oxygen. Since the passivation film on the oxidation electrode side separator surface is under a stable region thereof, releasing of impurity metal ions is prevented at other than a portion in which the electrons are conducted.

The inventors obtained the following findings based on the results of the above contact resistance and surface characteristics. That is, in the fuel electrode side separator, impurity metal ions are released from the surface thereof, and the electrolyte membrane is contaminated over a long period of time. Due to this, collecting resistance of the electrolyte membrane increases and power loss due to joule heat at the electrolyte membrane thereby increases, so that durability of the fuel cell is decreased. Therefore, if releasing impurity metal ions from the fuel electrode side separator is prevented, decrease in durability of the fuel cell due to the increase in collecting resistance of the electrolyte membrane can be prevented. In the oxidation electrode side separator, when contact resistance with a MEA is high, output performance as initial performance cannot be obtained sufficiently. Therefore, if the contact resistance of the oxidation electrode side separator with a MEA is decreased, output performance can be obtained sufficiently.

The inventors researched concrete methods for preventing release of impurity metal ions and for decreasing contact resistance of the oxidation electrode side separator. As a result, the inventors found that passivation treating is appropriately performed on only a surface of a fuel electrode side separator so that a Cr concentration is increased at a surface of the fuel electrode side separator and a Cr concentration is not increased at a surface of the oxidation electrode side separator. The inventors found that, in actual passivation treating on the fuel electrode side separator, a mass ratio of Cr to Fe is appropriately 0.7 to 1.3 by immersing a stainless steel separator in nitric acid or nitric-hydrofluoric acid. On the other hand, the inventors found that it is desirable that initial contact resistance not be excessively increased by not performing passivation treating in consideration of the fact that initial contact resistance is increased by performing passivation treating on the oxidation electrode side separator beforehand, and metal releasing from the oxidation electrode side is sufficiently prevented by passivation film formed in natural oxidation. The inventors found that a mass ratio of Cr to Fe at the surface of the oxidation electrode side separator is appropriately less than 0.7. The mass ratio of Cr to Fe denotes a maximum ratio of Cr to Fe in a passivation film.

The present invention was made based on the above findings, and provides a fuel cell having a layered structure, including: a membrane electrode assembly having a fuel electrode, an oxidation electrode, and an electrolyte membrane held between the fuel electrode and the oxidation electrode; and stainless steel separators holding the membrane electrode assembly therebetween, wherein the stainless steel separator contains Cr and Fe, the Cr concentration by mass % by mass ratio of Cr to Fe at the separator surface facing the fuel electrode is from 0.7 to 1.3, and the Cr concentration by mass % by mass ratio of Cr to Fe at the separator surface facing the oxidation electrode is less than 0.7.

According to the present invention, by passivation treating only the fuel electrode side separator, a fuel cell can prevent a decrease in durability due to corrosion of a separator under a use environment and a decrease in output performance due to excessive increase in contact resistance of a separator with a MEA. As a result, the fuel cell of the present invention can have a highly stable output performance for a long period of time.

As described above, in order to prevent corrosion of a metal separator due to a short circuit formed between separators which holds a MEA and to improve durability of a cooling medium surface, the cooling medium surface is required to have an electrical insulating characteristic. Therefore, it is necessary to form an insulating coating on the cooling medium surface. On the other hand, when the insulating coating is excessively formed on the cooling medium surface, electrical resistance is remarkably increased in a layered direction of the fuel cell, so that efficiency of the fuel cell is decreased. The inventors intensively researched techniques for improving the efficiency of fuel cells and durability of the cooling medium surface in high level, the efficiency and the durability being contrary to each other. As a result, the inventors found the following. That is, when insulating coatings are formed at inside surfaces of a cooling medium inlet and of a cooling medium outlet, insulating coatings are formed on the cooling medium passage in the vicinities of the cooling medium inlet and the cooling medium outlet, and insulating coating area is restricted. Furthermore, a concentration of Cr is controlled to be appropriate at portions except for the vicinities of the cooling medium inlet and the cooling medium outlet. As a result, sufficient fuel efficiency and good durability of the cooling medium can be obtained. The inventors found that the efficiency of the fuel cell and the durability of the cooling medium surface can be improved to a higher level by controlling a conductivity of the cooling medium. The present invention was made based on the above findings.

That is, the present invention provides a fuel cell including: a layered structure having: anode separators and cathode separators having groove passages on front and back surfaces thereof and being made of a stainless steel, steel anode separators and cathode separators being alternately layered, so that groove passages form a fuel gas passage, an oxidation gas passage, and a cooling medium passage; and a cooling medium inlet and a cooling medium outlet which penetrate the layered structure in a layering direction of the separators, thereby a cooling medium supplied from the cooling medium inlet being discharged from the cooling medium outlet via the cooling medium passage, insulating coatings formed on inner surfaces of the cooling medium inlet and the cooling medium outlet; and insulating coatings formed on the cooling medium passage in the vicinities of the cooling medium inlet and the cooling medium outlet, wherein the separator contains Cr and Fe, the Cr concentration of portions except for the vicinities of the cooling medium inlet and the cooling medium outlet is from 12 to 25 mass %.

Water or organic liquid having hydroxyl groups may be desirably used as the cooling medium for layered-type fuel cells having the separators in which the Cr concentration is controlled in the above manner and the MEA is combined with the separators. In particular, a conductivity of the cooling medium is desirably not more than 20 μS/cm from the point of that release of metal separator components to the cooling medium is prevented.

According to the present invention, an insulating coating is not formed on the totality of the cooling medium passage formed on the cooling medium surface of the separator, and the concentration of Cr is controlled to be appropriate at portions except for the vicinities of the above cooling medium inlet and the above cooling medium outlet. As a result, the efficiency of the fuel cell is improved by extremely inhibiting an increase in electrical resistance in a fuel cell layering direction, and contamination of the cooling medium due to leakage of impurity metal ions is inhibited by inhibiting corrosion of the separator material on the cooling medium surface. Durability of the cooling medium surface can thereby be improved, so that the fuel cell of the present invention can maintain high power generation efficiency for a long period of time. In a case in which the concentration of Cr is less than 12 mass % at portions except for the vicinities of the cooling medium inlet and of the cooling medium outlet, this case is not desirable since the cooling medium surface is easily corroded. On the other hand, in a case in which the Cr concentration exceeds 25 mass %, this case is not desirable since dissolving current (corrosion speed) is remarkably increased when the separator is in an excessively passivation condition.

In the present invention, conductivity of the cooling medium is desirable not more than 20 μS/cm. This is because corrosion current which flows in the metal separator is increased, and impurity metal ions thereby start to be released from the separator, so that contamination of the cooling medium progresses gradually.

The present invention provides another fuel cell including: a unit power generation cell having a separator with a cooling medium passage formed on a surface of the separator; cooling medium communicating holes for supplying a cooling medium and for discharging a cooling medium, the cooling medium communicating holes penetrating the unit power generation cell and having an insulating coating formed inside the cooling medium communicating holes; a cooling medium supply portion for supplying a cooling medium from the cooling medium communicating hole for supplying a cooling medium to the cooling medium passage; a cooling medium discharge portion for discharging a cooling medium from the cooling medium passage to the cooling medium communicating hole for discharging a cooling medium; and an insulating portion provided between the cooling medium supply portion and the cooling medium discharge portion and having an insulating coating formed thereinside, wherein the cooling medium communicating hole for supplying a cooling medium has a liquid resistance from 1.5 to 30 kΩ per unit power generation cell, and the insulating portion has a liquid resistance of from 0.2 to 15 MΩ.

According to the present invention, a liquid resistance of the cooling medium communicating hole in the unit power generation cell is an electrical resistance exhibited by the cooling medium in the cooling medium communicating hole of which the inside of each unit power generation cell is covered with an insulating coating. The liquid resistance of the cooling medium communicating hole is proportional to a cell thickness and is inversely proportional to a conductivity of the cooling medium and a cross sectional area of the cooling medium communicating hole. Generally, the liquid resistance of the cooling medium communicating hole is calculated from a length (cell thickness) of the cooling medium communicating hole in a unit cell, a cross sectional area of the cooling medium communicating hole and a conductivity of the cooling medium. The liquid resistance is controlled by controlling the length (cell thickness) of the cooling medium communicating hole in a unit cell, the cross sectional area of the cooling medium communicating hole and the conductivity of the cooling medium.

The insulating portion may be provided between the cooling medium supply portion for supplying a cooling medium to the cooling medium passage formed on the separator and the cooling medium discharge portion for discharging a cooling medium from the cooling medium passage. The insulating portion may be structured such that a portion contacting the cooling medium is covered with an insulating coating. The position of the insulating portion is arbitrary. For example, the insulating portion may be provided at the cooling medium supply portion and at the cooling medium discharge portion, and the length (creeping distance) of the insulating portion may be controlled, so that the liquid resistance is maintained. In this case, an insulating portion is not formed in the cooling medium passage, and an insulating portion is formed in the vicinity of both ends of the cooling medium passage, so that a predetermined liquid resistance can be maintained without decreasing a cooling efficiency of the cooling medium.

A liquid resistance of the insulating portion is proportional to a length of the insulating portion along the passage of the cooling medium and a conductivity of the cooling medium, and is reversely proportional to a cross sectional area of a passage at the insulating portion. The liquid resistance at the insulating portion is controlled by controlling these parameters.

In the present invention, a portion in which an insulating coating treatment is performed on a surface contacting the cooling medium is provided on the communicating hole and between the cooling medium supply portion and the discharge portion, so that corrosion current which flows via the cooling medium is inhibited by a resistance component of the liquid resistance of the above portions. That is, although the corrosion current is generated by a voltage generated in a fuel cell as a driving force, the liquid resistance of the cooling medium at the insulating portion is appropriately maintained, so that corrosion current which flows in other than the insulating portion is inhibited. In this case, the liquid resistance of the insulating portion at the communicating hole is positively used, so that a decrease in power generation efficiency can be inhibited when the liquid resistance is maintained only between the cooling medium supply portion and the cooling medium discharge portion.

That is, in the present invention, an inside of the communicating hole as a passage for providing and distributing the cooling medium to each cell is covered with an insulating coating, and the liquid resistance thereof is used for inhibiting corrosion current. That is, the liquid resistance per cell of the communicating hole having the inside covered with the insulating coating is set in a predetermined range, and inhibiting action of the corrosion current is thereby executed by the liquid resistance in the communicating hole, so that the inhibiting action of the corrosion current executed by the insulating portion between the cooling medium supply portion and the cooling medium discharge portion of the separator is reduced. As a result, the corrosion current can be inhibited by increasing the length (creeping distance) of the portion covered with the insulating coating between the cooling medium supply portion and the cooling medium discharge portion. Therefore, the area except for the power generating portion can be small, and preventing the corrosion of non-insulating portion of the separator and increasing the power generating efficiency of the fuel cell can be performed.

In the present invention, the insulating portion may be desirably provided at least one of the cooling medium supply portion and the cooling medium discharge portion. In this feature, since an electrical insulating coatings are formed at the cooling medium supply portion for supplying a cooling medium to the cooling medium passage of the separator and at the cooling medium discharge portion for discharging a cooling medium from the cooling medium passage, and an electrical insulating coating is not formed at the cooling passage, a decrease in cooling effect by the cooling medium can be inhibited. A rubber made of, for example, silicone may be used for electrical insulating coating, so that production cost can be decreased.

In the present invention, a conductivity of the cooling medium may be desirably low, and, for example, may be not more than 10 μS/cm. If the conductivity of the cooling medium exceeds 10 μS/cm, influence of corrosion current via the cooling medium is increased, so that inhibiting effect of the corrosion current by having the liquid resistance in the present invention is decreased.

Next, the lower limit of the liquid resistance of the communicating hole per cell will be explained. In a case in which the liquid resistance is the same degree as that of a common conductor, short circuits occur between cells via the cooling medium, so that the liquid resistance of the communicating hole per cell must be necessary not less than a predetermined value. The lower limit of the liquid resistance of the communicating hole per cell may be desirably about 1.5 kΩ as described the below. If the liquid resistance of the communicating hole per one cell is less than 1.5 kΩ, effects by the liquid resistance of the communicating hole are decreased, and this case is not desirable.

The upper limit of the liquid resistance of the communicating hole per cell will be explained hereinafter. That is, in a case in which the liquid resistance of the communicating hole per cell is higher, the case is desirable from a view of insulating characteristics of the cooling medium. However, in a case in which the liquid resistance of the communicating hole per cell is higher than a predetermined value, the inhibiting corrosion effect shows a saturated characteristic. In order to increase the liquid resistance of the communicating hole per cell, it is necessary to reduce the cross section area. However, the volume of flow of the cooling medium is limited. That is, it is difficult to equally distribute the cooling medium into each cell among plural cells with a stacked structure. In order to increase the liquid resistance of the communicating hole per cell, the cell thickness is large and the length of the communicating hole is large. However, the fuel cell then has a larger size and is heavy.

Although the liquid resistance can be secured by decreasing the conductivity of the cooling medium, the increase in conductivity of the cooling medium is not avoided due to releasing contamination component independent of electrical corrosion of components of the fuel cell. Due to this, it is difficult and is not useful to secure the liquid resistance by excessive decrease in the initial conductivity of the cooling medium for a long period of time. For this reason, the upper limit of the liquid resistance of the communicating hole per cell may be appropriately 30 kΩ.

If the liquid resistance of the separator portion between the cooling medium supply portion and the cooling medium discharge portion in one unit cell is less than 0.2 MΩ, the conductivity of the cooling medium remarkably increases. This is because corrosion of materials of the separator is progressed by the corrosion current generated due to the low liquid resistance and the metal ion concentration thereby increases in the cooling medium.

The upper limit of the liquid resistance of the separator portion between the cooling medium supply portion and the cooling medium discharge portion in one unit cell may be desirably about 15 MΩ. This is because the inhibiting effect of the corrosion current exhibits a saturated characteristic and the power generating efficiency is remarkably decreased due to reduction of the power generating portion together with the insulating portion being secured if the liquid resistance of the separator portion between the cooling medium supply portion and the cooling medium discharge portion in one unit cell is more than 15 MΩ.

The decrease in power generating efficiency because the power generating area cannot be secured will be explained hereinafter. It is necessary to provide an insulating portion having a predetermined length (creeping distance) for securing the liquid resistance between the cooling medium supply portion and the cooling medium discharge portion of the separator portion. In the insulating portion, since the inside thereof is covered with the insulating coating, cooling effect by the cooling medium is decreased. Due to this, a region of the insulating portion must be other than the power generating region. Due to this, if the creeping distance is elongated in order to secure the liquid resistance, a portion except for the power generating portion must be large so that the power generating efficiency is reduced.

As described above, a liquid resistance of the cooling medium communicating hole for supplying a cooling medium is appropriately 1.5 to 30 kΩ per unit power generation cell, and a liquid resistance at the insulating portion is 0.2 to 15 MΩ.

The present invention provides another fuel cell including: a unit power generation cell having a separator with a cooling medium passage formed on a surface of the separator; cooling medium communicating holes for supplying a cooling medium and for discharging a cooling medium, the cooling medium communicating holes penetrating the unit power generation cell and having an insulating coating formed inside of the cooling medium communicating holes; a cooling medium supply portion for supplying a cooling medium from the cooling medium communicating hole for supplying a cooling medium to the cooling medium passage; a cooling medium discharge portion for discharging a cooling medium from the cooling medium passage to the cooling medium communicating hole for discharging a cooling medium; and an insulating portion provided between the cooling medium supply portion and the cooling medium discharge portion and having an insulating coating formed thereinside, wherein a liquid resistance R1 between both ends of the cooling medium communicating hole for supplying a cooling medium and a liquid resistance R2 at the insulating portion satisfy the following relationship.

$$(R1/R2)=0.1 \text{ to } 3$$

In another fuel cell of the present invention, the liquid resistance R1 between both ends of the cooling medium communicating hole denotes a liquid resistance exhibited by integrating the communicating hole per unit power generation cell and the number of the unit power generation cell.

According to another fuel cell of the present invention, the inside of the cooling medium communicating hole is covered with the insulating coating, the integrated value R1 exhibited by the cooling medium communicating hole of each cell is the same as the integrated value R2 exhibited by the insulating portion of the separator of each cell, whereby voltage decreasing function obtained by the insulating portion can be reduced. As a result, the creeping distance for securing the insulating portion can be reduced, and the decrease in the power generating efficiency due to the provided insulting portion can be reduced.

The value R1/R2 may be appropriately 0.1 to 3. If the value R1/R2 is less than 0.1, the effect of the voltage decreasing action obtained by the cooling medium communicating hole is decreased. Due to this, it is necessary to secure a large creeping distance of the insulating portion.

In order to increase the value R1/R2, it is necessary for securing the value of R1 to decrease the cross section area of the cooling medium communicating hole or to decrease the conductivity of the cooling medium. However, as described the below, if the cross sectional area of the cooling medium communicating hole is decreased, a decrease in supplying volume of the cooling medium is caused. On the other hand, there is a limit to the decrease in the conductivity of the cooling medium. In order to increase the value R1/R2, it is thought that the value of R2 should be decreased. However, in this case, the liquid resistance of the insulating portion between the cooling medium supply portion and the cooling medium discharge portion is not desirably much decreased from the point of inhibiting the effects of corrosion current. Therefore, the value R1/R2 may be desirably not more about than 3.

The present invention as described above may be useful when applied to a fuel cell having a structure in which not less than 50 unit power generation cells are stacked. As described below, the present invention uses the integrated liquid resistance (integrated value of the liquid resistance for each cell) of the cooling medium communicating hole penetrating plural layered cells, reduces the voltage applied to the cell disposed at a higher voltage side via the cooling medium, and thereby reduces the corrosion current which is remarkably generated at the higher voltage side. Therefore, in a case in which the number of layered cells exceeds a predetermined number, the effects can be remarkably obtained. As described below, the effect of inhibiting corrosion is obtained when the number of cells stacked exceeds about 50, and the effect is prominent when the number of cells stacked exceeds about 100.

According to the present invention, the voltage applied to the portion of the separator which is not covered with the insulating coating, via the cooling medium, can be reduced, so that the corrosion current can be inhibited and progress in corrosion can be inhibited. As a result, the contamination of the cooling medium can be prevented and formation of short circuits due to the contamination of the cooling medium can be prevented. The above cooling effect by the cooling medium can be obtained so that it is decreased.

Since the corrosion of the separator can be inhibited, decrease in thickness of the separator and decrease in strength of the separator can be avoided. In particular, since the corrosion current can be reduced, release of metal ions from the metal separator can be reduced, a large increase in the conductivity of the cooling medium due to influence of the metal ions can be inhibited, and the decrease in power generating performance together with decrease in ion exchange amount due to influence of metal ions can be inhibited.

In addition, by optimizing the combination of the range of the liquid resistance of the cooling medium communicating hole per unit power generation cell and the range of the liquid resistance between the cooling medium supply portion and the cooling medium discharge portion which leads to the cooling medium passage formed in the separator, the corrosion prevention effect can be obtained without enlarging a portion except for the power generating portion. That is, corrosion of the separator can be prevented and the decrease in the power generating efficiency of the fuel cell can be inhibited as much as possible.

In the fuel cell having a structure in which plural cells are stacked, the inside of the cooling medium communicating hole penetrating plural cells is covered with the insulating coating, the value R1 between both ends of the cooling medium communicating hole is the same as the value R2 of the insulating portion communicating with the cooling medium passage of the separator (for example, the value (R1/R2) is about 0.1 to 3), whereby corrosion current in the cell disposed at the higher voltage side can be decreased and corrosion of the cell component materials can thereby be inhibited.

BRIEF DESCRIPTION OF THE DRAWINGS

FIG. 1A shows a fuel cell side separator, and FIG. 1B shows an oxidation cell side separator.

FIG. 3A shows a power generation surface of the anode separator, FIG. 3B shows a power generation surface of the cathode separator, FIG. 3C shows a cooling medium surface of the anode separator, and FIG. 3D shows a cooling medium surface of the cathode separator.

Figure 1A:
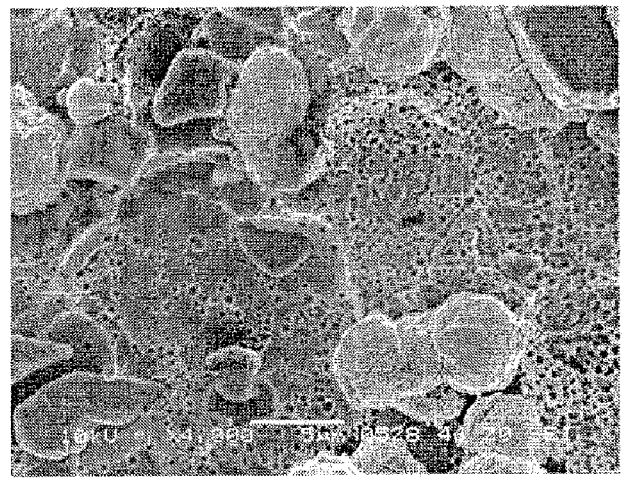
FIGS. 1A and 1B are photographs showing surface characteristics of a conventional separator after a predetermined period of power generation.
Figure 1B:
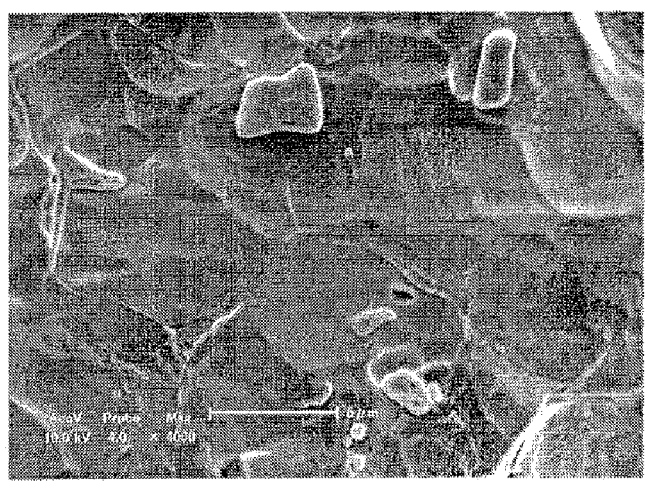

DESCRIPTION OF THE PREFERRED EMBODIMENTS (1) First Embodiment

In producing a fuel cell of a First Embodiment according to the present invention, in particular, the types of stainless steel plate as a separator substrate are not restricted as long as the stainless steel plate is a corrosion resistant under an atmosphere in which a fuel cell is used. Concretely, various ferrite-types, austenite-types, or a two phase-types of stainless steel can be used. The stainless steel plate desirably contains Cr of not less than 12 mass %. The thickness of the stainless plate is desirably 0.05 to 0.3 mm in consideration of assembly of the fuel cell.

A passivation film naturally generated in air is formed on a stainless steel separator surface under an environment in which the fuel cell is used. In the condition in which the above passivation film is naturally generated, an oxidation electrode side separator surface is sufficiently oxidation resistant even when exposed to an oxidation atmosphere. It is therefore not necessary that the oxidation electrode side separator surface be further subjected to a passivation treatment. On the other hand, a fuel electrode separator surface is not sufficiently oxidation resistant when exposed to a reducing atmosphere, so that release of metal ion impurities therefrom occurs. Due to this, it is necessary that the fuel electrode side separator surface be subjected to a passivation treatment in addition to the passivation film naturally generated in an atmosphere. As a passivation treatment method, immersing a separator in an oxidation acid such as a nitric acid or a nitric-hydrofluoric acid can be used. In a case in which a separator is immersed to a solution containing a chlorine ion, pitting is generated on a surface of a stainless steel, so that sufficient corrosion resistance cannot be obtained.

As described above, in the case in which a separator is immersed in an oxidation acid such as a nitric acid or a nitric-hydrofluoric acid, the nitric acid concentration is desirably 5 to 30 mass % in order to appropriately grow a passivation film. If the nitric acid concentration is less than 5 mass %, a passivation film does not efficiently grow. On the other hand, if the nitric acid concentration exceeds 30 mass %, a passivation film grows to have an excessive thickness, so that an initial contact resistance increases. The temperature range of the solution is desirably 20 to 80 degrees C. If the temperature of the solution is less than 20 degrees C., the growing time of the passivation film is large. On the other hand, if the temperature of the solution exceeds 80 degrees C., it is difficult to control the Cr component in the passivation film, and acid fumes reduce the quality of the environment.

As described the above, the fuel electrode side separator is subjected to a passivation treatment and the oxidation electrode side separator is not subjected to a passivation treatment, and the separators are disposed on both sides of a MEA, so that a fuel cell is assembled. In the fuel cell, release of metal ion impurities is prevented on the fuel electrode side separator surface which is under a heavy corrosion environment, so that good durability can be obtained. Excessive generation of the passivation film can be prevented on the oxidation electrode side separator surface which is under a relatively weak corrosion environment, so that good contact resistance can be obtained and output performance can thereby be improved. As a result, loss due to joule heating can be inhibited, and high power generation efficiency can be maintained for a long period of time.

(A) Examples 1 to 3 and Comparative Examples 1 and 2

The present invention will be described in detail hereinafter by way of Examples and Comparative Examples.

A passivation treatment performed on a stainless steel separator surface will be explained. In order to prevent release of metal ion impurities from a separator surface, the separator surface was subjected to a nitric acid, so that a passivation film was formed which was Cr-enriched. In Examples 1 to 3, a stainless steel having a composition shown in Table 2 was immersed in a nitric acid solution of 50 mass %. The immersing time was 5, 30, or 120 minutes. In Comparative Examples 1 and 2, a stainless plate which was not subjected to a passivation treatment and a stainless plate which was boiled in nitric acid solution of 50 mass % for 24 hours were used as a sample. Next, compositions of the above passivation films were analyzed by Auger Electron Spectroscopy. Table 3 shows measurement results of maximum ratio of Cr to Fe in the passivation film of the Examples 1 to 3 and the Comparative Examples 1 and 2, and measurement results of contact resistance with a load of 15 kgf/cm$^2$ was applied thereto together with a carbon sheet after a passivation treatment.

TABLE 2

Stainless Steel Composition of Examples and Comparative Examples (mass %)

| C | Si | Mn | Ni | Cr | Mo | B |
|---|----|----|----|----|----|---|
| 0.01 | 0.3 | 1.1 | 10.5 | 20.9 | 2.3 | 0.6 |

TABLE 3

Maximum Cr/Fe ratio in passivation film and contact resistance (mΩ · cm$^2$)

| | Passivation treatment condition | Maximum Cr/Fe Ratio | Contact Resistance |
|---|---|---|---|
| Example 1 | 50 degrees, 5 minutes | 0.7 | 8 |
| Example 2 | 50 degrees, 30 minutes | 1.1 | 10 |
| Example 3 | 50 degrees, 120 minutes | 1.3 | 12 |
| Comparative Example 1 | Without passivation treatment | 0.4 | 6 |
| Comparative Example 2 | 24 hours boiling | 1.7 | 50 |

As shown in Table 3, in the Examples 1 to 3, the maximum ratio of Cr to Fe is increased by the passivation treatment in comparison with the Comparative Example 1. In the Comparative Example 2 in which a 24-hours boiling treatment was performed, the ratio of Cr to Fe is increased and the contact resistance with the carbon sheet is increased in comparison with the Comparative Example 1. This is because the ratio of Cr to Fe is increased and the thickness of the passivation film is also increased since the surface of the Comparative Example 2 in which the boiling treatment was performed turned yellow.

(B) Example 4 and Comparative Examples 3 to 5

As described below, each type (1) to (4) was prepared regarding combinations of a fuel electrode side separator and an oxidation electrode side separator of a fuel cell based on the above result of the Examples 1 to 3 and the Comparative Examples 1 and 2.

Type (1): A stainless steel separator as a fuel electrode side separator was prepared such that a stainless steel having a composition shown in Table 2 was formed to be a separator-shaped, and was subjected to a passivation treatment for 30 minutes in a nitric acid of 50 mass % at a temperature of 50 degrees C. A stainless steel separator as an oxidation electrode side separator was prepared such that a stainless steel having composition shown in Table 2 was formed to be a separator-shaped.

Type (2): A stainless steel separator as a fuel electrode side separator was prepared such that a stainless steel having a composition shown in Table 2 was formed to be in the form of a separator. A stainless steel separator as an oxidation electrode side separator was the same as the fuel electrode side separator.

Type (3): A stainless steel separator as a fuel electrode side separator was prepared such that a stainless steel having a composition shown in Table 2 was formed to be in the form of a separator. A stainless steel separator as an oxidation electrode side separator was prepared such that a stainless steel having composition shown in Table 2 was formed to be in the form of a separator, and was subjected to a passivation treatment for 30 minutes in a nitric acid of 50 mass % at a temperature of 50 degrees C.

Type (4): A stainless steel separator as a fuel electrode side separator was prepared such that a stainless steel having a composition shown in Table 2 was formed to be in the form of a separator, and was subjected to a passivation treatment for 30 minutes in a nitric acid of 50 mass % at a temperature of 50 degrees C. A stainless steel separator as an oxidation electrode side separator was the same as the fuel electrode side separator.

Fuel cells of an Example 4 and Comparative Examples 3 to 5 were obtained by providing each separator Type (1) to Type (4) on a fuel electrode side on an oxidation electrode side thereof. In these fuel cells, hydrogen gas was used as a fuel gas, an air was used as an oxidation gas. These fuel cells were continuously operated at 0.5 A/cm$^2$ for 200 hours. After generating power, the corrosion states of the stainless steel separators were examined, and the contact resistance with a load of 15 kgf/cm$^2$ applied to a carbon sheet was measured. These results are shown in Table 4.

As shown in Table 4, there were no increases in the contact resistance of the fuel electrode side separator and the oxidation electrode side separator in each fuel cell.

As shown by the above results, in the fuel cell of the Example 4 in which the stainless steel separator subjected to a passivation treatment was integrated as the fuel electrode side separator, corrosion did not occur even on the fuel electrode side under a severe corrosion environment, and initial contact resistance of the oxidation electrode side did not increase, so that it was confirmed that the fuel cell of the Example 4 had high power generation efficiency.

The present invention can be used as various kinds of power source in which it is necessary to maintain high power generation efficiency for a long period of time, and in particular can be used in many fields such as the automobile industry, the electrical apparatus industry, and the communications industry.

(2) Second Embodiment

A second preferred embodiment of the present invention will be described hereinafter with reference to the Figures.

Figure 2:
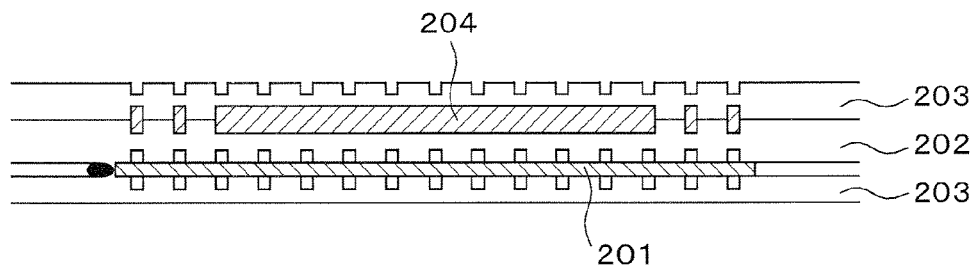
FIG. 2 is a cross sectional view showing a cell structure in a fuel cell according to the present invention.

FIG. 2 is a cross sectional view showing a cell structure in a fuel cell of the Second Embodiment according to the present invention. As shown in FIG. 2, a cell has a MEA 201, an anode separator 202, a cathode separator 203, and a cooling medium 204. The anode separator 202 and the cathode separator 203 are opposite to both sides of the MEA 201. The cooling medium 204 is disposed between the anode separator 202 and the cathode separator 203 at a position in which a MEA is not disposed therebetween. A fuel cell of the Second Embodiment according to the present invention has a stacked structure such that the above plural cells are stacked.

TABLE 4

Corrosion Condition of Separator and Contact Resistance of Fuel Cell Before and After Continuous Operation

|  | Surface Condition of Separator | Corrosion Condition | Contact Resistance (before Power generation) | Contact Resistance (after Power generation) |
|---|---|---|---|---|
| Example 4 | (fuel) passivation treatment | None | 10 | 10 |
|  | (oxidation) without passivation treatment | None | 6 | 6 |
| Comparative Example 3 | (fuel) without passivation treatment | Facet generation | 6 | 6 |
|  | (oxidation) without passivation treatment | None | 6 | 6 |
| Comparative Example 4 | (fuel) without passivation treatment | Facet generation | 6 | 6 |
|  | (oxidation) passivation treatment | None | 10 | 10 |
| Comparative Example 5 | (fuel) passivation treatment | None | 10 | 10 |
|  | (oxidation) passivation treatment | None | 10 | 10 |

In Table 4, "fuel" denotes fuel electrode side separator, and "oxidation" denotes oxidation electrode side separator. Units of contact resistance are mΩ × cm$^2$.

As shown in Table 4, in the fuel cells of the Example 4 and the Comparative Example 5 of which the fuel electrode side separator was subjected to a passivation treatment, there were no corrosion marks on the surface of the fuel electrode side separator and the oxidation electrode side separator. In contrast, in the fuel cells of the Comparative Examples 3 and 4 of which the fuel electrode side separator was not subjected to a passivation treatment, facets were formed on the surface of the fuel electrode side separator, and there were corrosion marks.

In the above cell, cooling medium 204 is circulated between a surface opposite to a side of the anode separator 202 contacting the MEA 201 and a surface opposite to a side of the cathode separator 203 contacting the MEA 201. The cooling medium 204 can be circulated not only in every cell but also in any group of cells.

Figure 3A:
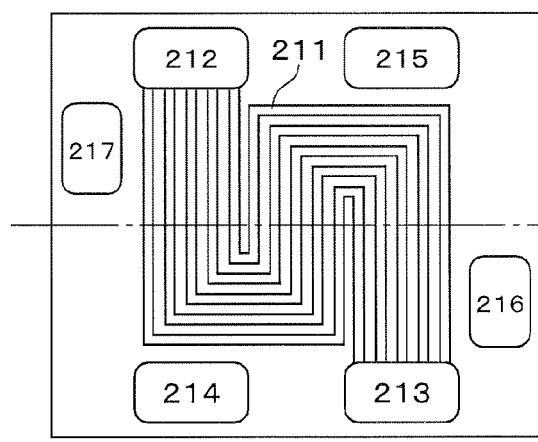
FIGS. 3A to 3D are plane views of each separator in the case in which the cell shown in FIG. 2 is disassembled into an anode separator and a cathode separator.
Figure 3B:
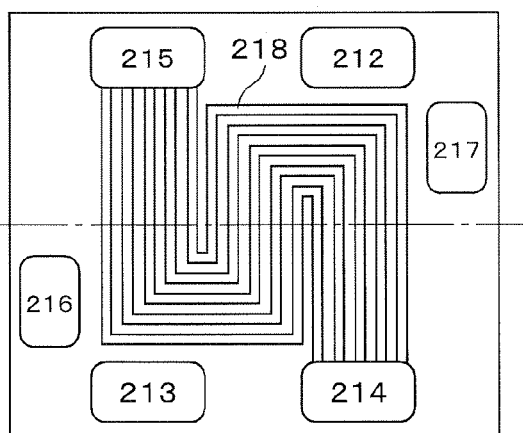
Figure 3C:
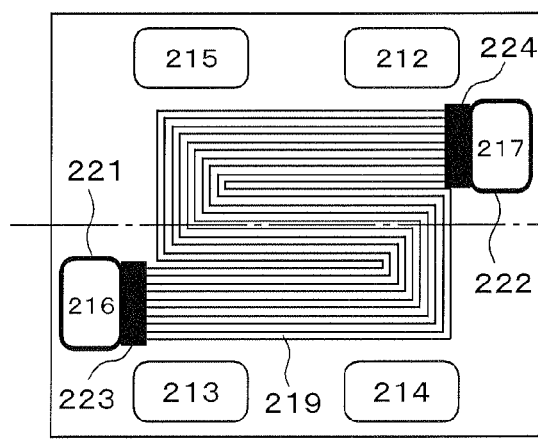
Figure 3D:
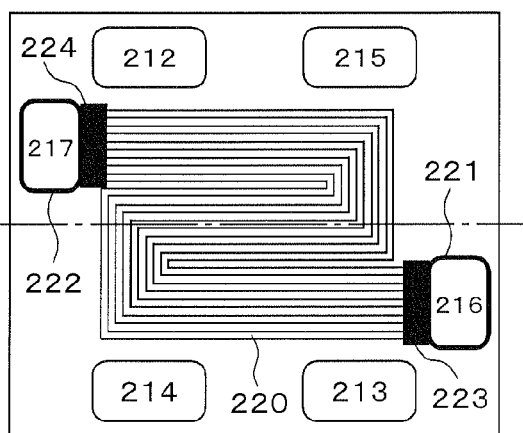

FIGS. 3A to 3D are plane views of each separator 202 and 203 in the case in which the cell shown in FIG. 2 is disassembled into the anode separator 202 and the cathode separator 203 and the MEA 201 and the cooling medium 204 are omitted. That is, FIG. 3A shows a power generation surface of the anode separator 202, and FIG. 3B shows a power generation surface of the cathode separator 203. On the other hand, FIG. 3C shows a cooling medium surface of the anode separator 202, and FIG. 3D shows a cooling medium surface of the cathode separator 203. A chain line in each FIG. 3A to 3D denotes a cross section line shown in FIG. 2.

As shown in FIG. 3A, five fuel gas passage grooves 211 having serpentine-shaped portions parallel to each other are formed on the power generation surface of the anode separator 202. The fuel gas passage grooves 211 communicate with a fuel gas supply side communicating hole 212 and a fuel gas discharge side communicating hole 213, which are disposed around the fuel gas passage grooves 211 and penetrates in a direction perpendicular to the sheet of FIG. 3A. An oxidizing gas supply communication hole 214, an oxidizing gas discharge communication hole 215, a cooling medium supply communication hole 216, a cooling medium discharge communication hole 217 which penetrate in a direction perpendicular to the sheet of FIG. 3A are formed around the fuel gas passage grooves 211.

As shown in FIG. 3B, five oxidizing gas passage grooves 218 having serpentine-shaped portions parallel to each other are formed on the power generation surface of the cathode separator 203. The oxidizing gas passage grooves 218 communicates with an oxidizing gas supply side communicating hole 214 and an oxidizing gas discharge side communicating hole 215, which are disposed around the fuel gas passage grooves 211 and penetrates in a direction perpendicular to the sheet of FIG. 3B. A fuel gas supply communication hole 212, a fuel gas discharge communication hole 213, a cooling medium supply communication hole 216, and a cooling medium discharge communication hole 217 which penetrate in a direction perpendicular to the sheet of FIG. 3B is formed around the fuel gas passage grooves 218.

As shown in FIG. 3C, five cooling medium passage grooves 219 having serpentine-shaped portions parallel to each other are formed on the power generation surface of the anode separator 202. The fuel gas passage grooves 218 communicate with a cooling medium supply side communicating hole 216 and a cooling medium discharge side communicating hole 217, which are disposed around the fuel gas passage grooves 211 and penetrate in a direction perpendicular to the sheet of FIG. 3C. A fuel gas supply communication hole 212, a fuel gas discharge communication hole 213, an oxidizing gas supply communication hole 214, and an oxidizing gas discharge communication hole 215 which penetrate in a direction perpendicular to the sheet of FIG. 3C are formed around the fuel gas passage grooves 218.

As shown in FIG. 3D, five cooling medium passage grooves 220 having serpentine-shaped portions parallel to each other are formed on the power generation surface of the cathode separator 203. The cooling medium passage grooves 218 communicates with a cooling medium supply side communicating hole 216 and a cooling medium discharge side communicating hole 217, which are disposed around the fuel gas passage grooves 211 and penetrates in a direction perpendicular to the sheet of FIG. 3D. A fuel gas supply communication hole 212, a fuel gas discharge communication hole 213, an oxidizing gas supply communication hole 214, and an oxidizing gas discharge communication hole 215 which penetrate in a direction perpendicular to the sheet of FIG. 3D are formed around the fuel gas passage grooves 218.

Both separator structures disposed in the cell of the Second Embodiment according to the present invention are described above. Both cooling medium surfaces of the present invention will be described in detail.

As shown in FIGS. 3C and 3D, the cooling medium is distributed to a cooling medium passage having the cooling medium passages 19 and 20 of each cell via the cooling medium supply side communicating hole 216 formed at the anode separator and the cathode separator, and the cooling medium is discharged from the cooling medium discharge side communicating hole 217 at the anode separator and the cathode separator. In this case, in order to prevent formation of short circuits among the anode separator, the cathode separator, and the cooling medium, insulating coatings 221 and 222 are formed at inside surfaces of the cooling medium supply side communicating hole 216 and the cooling medium discharge side communicating hole 217, and insulating coatings 223 and 224 are formed in the vicinities of the cooling medium supply side communicating hole 216 and the cooling medium discharge side communicating hole 217 of the cooling medium passage forming region. As a result, electrical conduction among both separators and the cooling medium is prevented and excessive corrosion current in each separator is prevented, so that contamination of the cooling medium due to leakage of metal ion impurities can be prevented, and durability of the cooling medium surface can be improved. The formed region of the insulating coating is restricted to the insides of the communicating holes 216 and 217 and a predetermined region of the cooling medium passage, so that electrical resistance in a fuel cell layered direction can be inhibited as long as possible.

Figure 4:
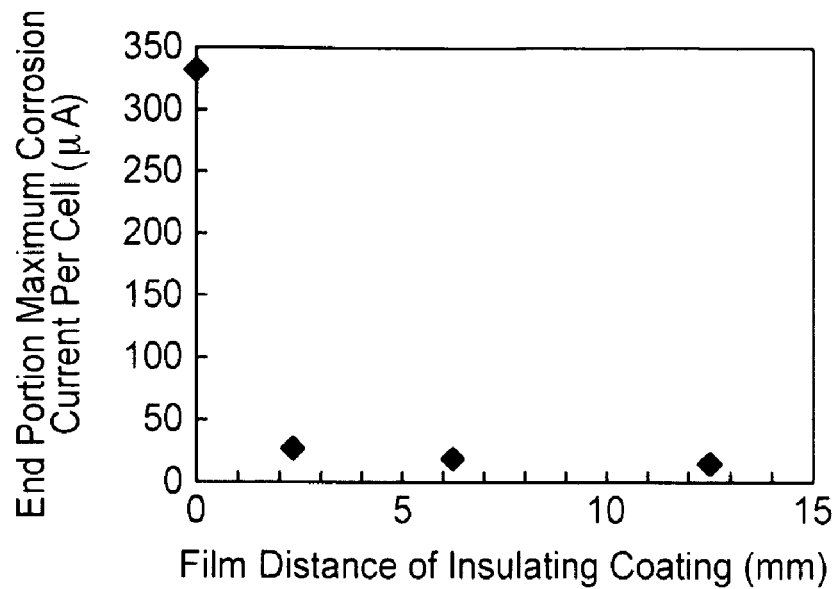
FIG. 4 is a graph showing a relationship of an end portion maximum corrosion current for one cell and a covered distance of an insulating coating.
Figure 5:
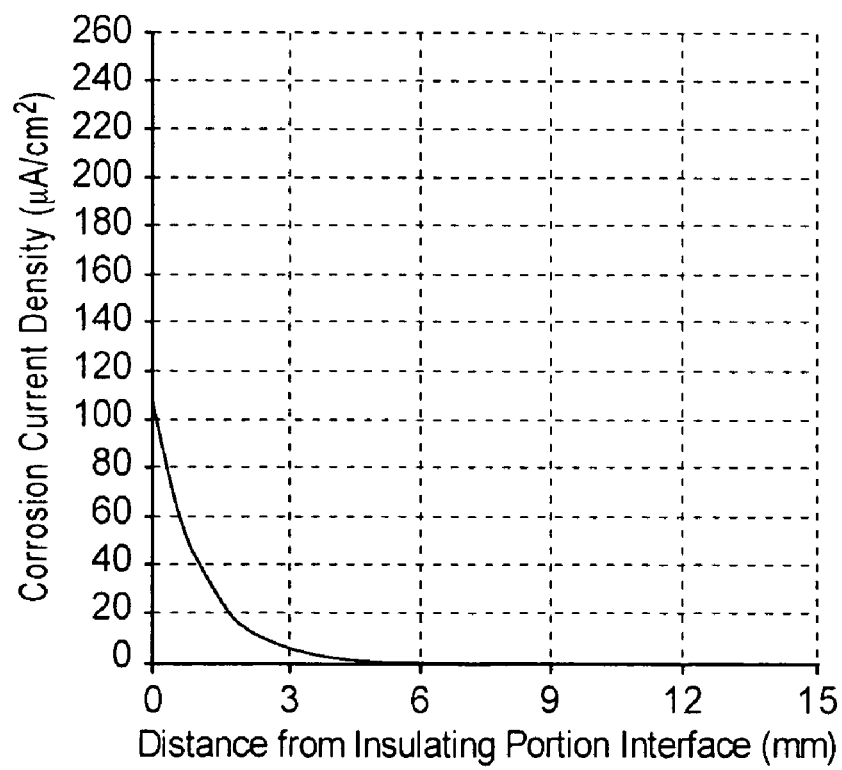
FIG. 5 is a graph showing a current distribution in a cooling medium discharge side communicating hole.

The distances of insulating coatings 223 and 224 from the communicating holes 216 and 217 are dependent on the conductivity of the cooling medium, the cross section areas in the vicinities of the communicating holes, and thickness of the cell. FIG. 4 is a graph showing a relationship of an end portion maximum corrosion current for one cell and a covered distance of an insulating coating. In FIG. 4, the cell voltage is 1V, the distance between cells is 1.85 mm, the communicating hole cross section is 12.4 $cm^2$, and the conductivity of the cooling medium is 5 µS/cm. As shown in FIG. 4, it is confirmed that the insulating coatings 223 and 224 are formed in the vicinities of the communicating holes 216 and 217 of the cooling medium passage formed region so that the corrosion current at the metal exposed portions of both separators can be reduced to be about 30 µA per cell at maximum. FIG. 5 is a graph showing a current distribution in the cooling medium discharge side communication hole in the case in which the total current is 21.9 µA, the end portion maximum current is 110.1 $\mu A/cm^2$, and the cooling medium conductivity is 5 µS/cm. As shown in FIG. 5, it is confirmed that even if the corrosion current is about 20 µA for one cell, the interface of the insulating portion and the exposed portion has a current density of not less than 100 $\mu A/cm^2$ in the case in which the cooling medium conductivity is not more than 5 µS/cm.

When the stainless steel separator is in the condition in which the interface of the insulating portion and the exposed portion has a current density of not less than 100 $\mu A/cm^2$, the stainless steel separator reaches the potential region allowing excessive passivation dissolving, so that dichromic acid or chromic acid is released from the surface of the stainless steel, and corrosion possibly occurs so as to penetrate the separator. Due to metal ions dissolved in the cooling medium, a vicious cycle occurs such that the conductivity of the cooling medium increases, and the corrosion current circulated in the separator increases.

Figure 6:
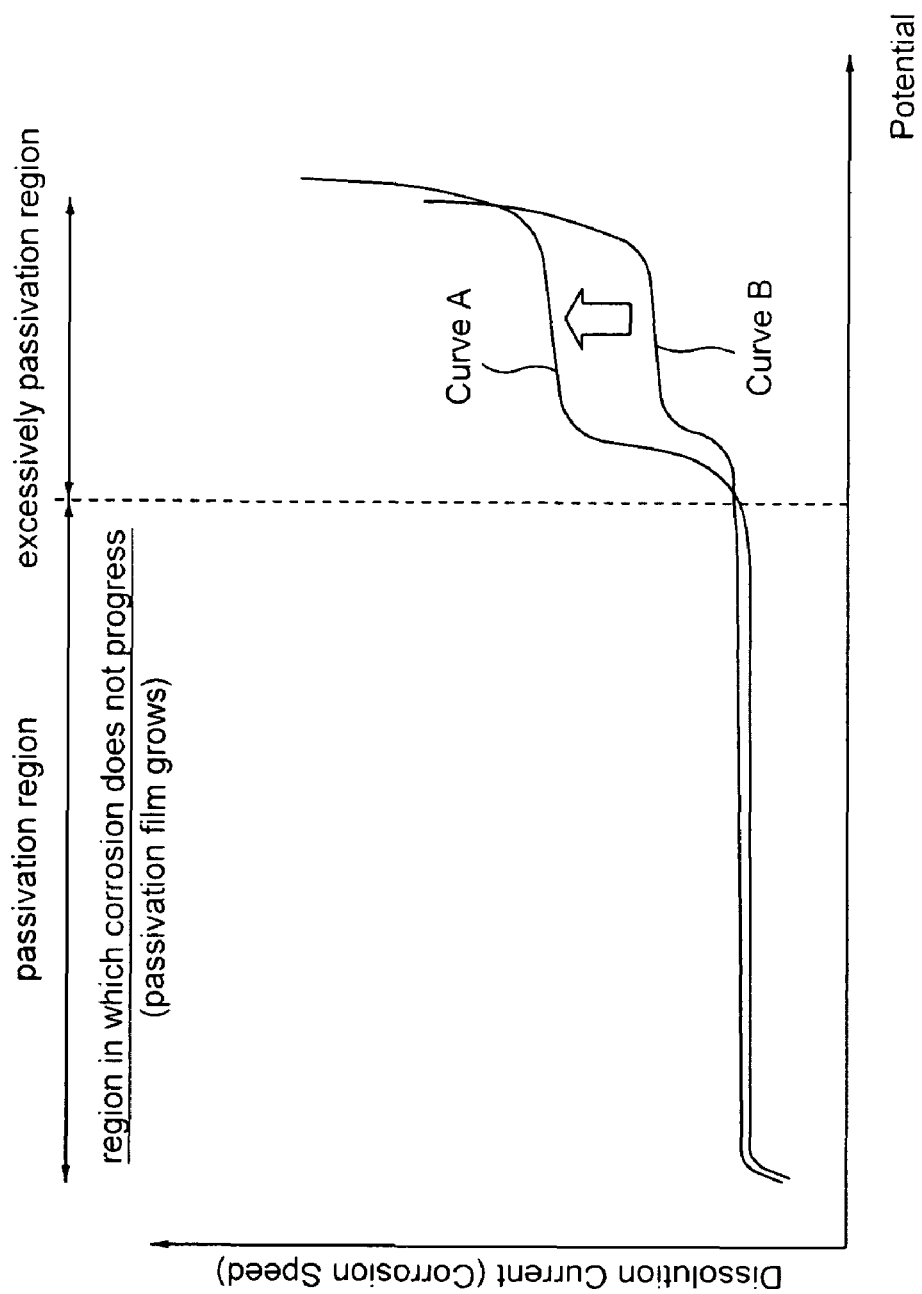
FIG. 6 is a graph showing a relationship of dissolution current (corrosion speed) and a potential.

FIG. 6 is a graph showing a relationship of dissolution current (corrosion speed) and a potential. In FIG. 6, a curve A shows a case in which the concentration of Cr is 32 mass % on the separator surface, and a curve B shows a case in which the concentration of Cr is 16 mass % on the separator surface. As shown in FIG. 6, it is confirmed that the dissolution current at the above excessive passivation region increases as the concentration of Cr increases on the stainless steel surface. In the past, in order to improve the durability of the separator, the passivation treatment for increasing the concentration of Cr on the separator surface was recommended. However, the conventional passivation treatment was performed on the separator power generation surface. In consideration of the above conventional cases, the inventors have intensively researched methods to improve the durability of the cooling medium surface, and thereby found that the treatment for decreasing the concentration of Cr on the cooling medium surface rather than for increasing the concentration of Cr on the cooling medium surface is performed or the cooling medium surface is maintained to have the concentration of Cr of the matrix so that the corrosion current can be inhibited at the excessive passivation region. Concretely, the concentration of Cr on the stainless steel surface is 12 to 25 mass % so that the release of the metal ions therefrom due to excessive passivation dissolving can be inhibited. The method for decreasing the concentration of Cr on the stainless steel surface is as follows. That is, a Cr enriched oxide film is formed on the stainless steel surface under a high temperature oxidation atmosphere and a Cr deficient layer having a low concentration of Cr is formed thereunder. After that, the Cr enriched oxide film is electrolyzed in sodium sulfate, and is dissolved and removed, so that the Cr deficient layer is exposed. The current which is not used for inhibiting the corrosion current is used for an oxygen gas generating reaction generated at higher potential or an oxidation reaction of ethylene glycol as a cooling medium component. Therefore, in the fuel cell of the Second Embodiment according to the present invention, the portion separated from the cooling medium supply side communicating hole 216 and the cooling medium discharge side communicating hole 217 at a predetermined distance of the cooling medium passage formed region is not eroded.

(A) Examples 5 to 7 and Comparative Example 6

The present invention will be described in detail hereinafter by using Examples 5 to 7 and a Comparative Example 6.

A carbon powder having a platinum catalyst on a surface thereof was dispersed in a polymer electrolyte alcohol solution so as to form a slurry. On the other hand, a carbon sheet having a thickness of 200 μm as a gas diffusion electrode was immersed in a water dispersion of polytetrafluoroethylene (PTFE), was dried, and was subjected to a heat treatment, so that a porous electrode substrate which is water-repellent was obtained. A polymer electrolyte slurry containing a carbon powder having the platinum catalyst was coated on one side of the porous electrode substrate and was dried. As a result, a gas diffusion electrode having an electrode reaction layer on the one side thereof was obtained.

Next, an electrolyte membrane was held by a pair of the gas diffusion electrodes such that the surfaces of the electrolyte membrane was opposite to electrode reaction layers thereof, and was subjected to hot pressing at a temperature of 110 degrees C. for 30 seconds. As a result, a MEA which was joined body of the electrolyte membrane and the electrodes was produced. In addition to a carbon sheet, a carbon cloth made such that a carbon fiber is woven can be used as a flexible material for the gas diffusion layer. A carbon felt formed such that carbon fibers and carbon powder are mixed with each other and an organic binder is added thereto can be used for the gas diffusion layer.

Separators were used for holding the obtained MEA. The separators were structured such that stainless steel plates which had a composition in which the balance was Fe as shown in Table 2 of the First Embodiment, were subjected to a cutting treatment, and a gas passage was formed.

With reference to FIGS. 2 and 3A to 3D, communication holes for supplying gas, discharging gas, supplying cooling medium and discharging cooling medium were provided around a gas passage of a separator. After that, the separator plate was subjected to an oxidizing treatment at a temperature of 1000 degrees C. for 10 minutes in a muffle furnace. After the separator plate was taken out from the muffle furnace, the separator plate was forcibly cooled by a fan in order to prevent precipitation of Cr carbonized material which promotes corrosion. In this case, when the concentration of C is not less than 0.08 mass % in the stainless steel, the separator plate is desirably cooled in water in order to prevent precipitation of Cr carbonized material.

Next, in order to remove the oxidized scale generated on a separator surface, the separator plate was subjected to an electrolysis acid washing treatment in a sodium sulfate solution of 180 g/L at a temperature of 80 degrees C. The separator was subjected to anode-electrolyzing treatment in the electrolysis conditions as shown in Table 5. In the above manner, each separator of Examples 5 and 6 was obtained such that each concentration of Cr on the surface was controlled to be 12 and 16 mass %. A separator of an Example 7 was obtained such that a stainless steel plate was not subjected to a heat treatment and an electrolysis acid washing treatment and was subjected to cut working so that the concentration of Cr on the surface was controlled to be 25 mass %. A separator of a Comparative Example 6 was obtained such that a stainless steel was not subjected to acid washing treatment, and was subjected to a passivation treatment of 10 mass % at a temperature of 50 degrees C. so that the concentration of Cr on the surface was controlled to be 32 mass %. The concentration of Cr on each separator surface of the Examples 5 to 7 and the Comparative Example 6 was obtained by Auger Electron Spectroscopy (AES) analysis. The concentration of Cr was obtained as a ratio of atomic weight of Cr with respect to total atomic weight of Fe, Cr, Ni, and Mo which were main components of the stainless steel.

TABLE 5

Electrolysis Condition of Each Separator

| | Current Density (mA/cm$^2$) | Electrolysis time (second) | Density of Cr on surface (mass %) |
|---|---|---|---|
| Example 5 | 50 | 20 | 12 |
| Example 6 | 50 | 60 | 16 |
| Example 7 | Machining without heat treating and acid washing | | 25 |
| Comparative Example 6 | Passivation treating without heat treating | | 32 |

Next, in order to prevent electrical corrosion due to cooling medium liquid junctions, the insides of the cooling medium supply side communicating hole 216 and the cooling medium discharge side communicating holes 217 were subjected to insulating coating in the same manner as shown in FIGS. 3C and 3D. The vicinities of the cooling medium supply side communicating hole 216 and the cooling medium discharge side communicating holes 217 of the cooling medium passage formed region were subjected to insulating coating as shown in FIGS. 3C and 3D. In insulating coating, a rubber of silicone was used and the covered thickness was 0.5 mm. The distances of the covered portion of the cooling medium passage groove 219, that is, the insulating distances from the cooling medium supply side communicating hole 216 and from the cooling medium supply side communicating hole 217 were 5 mm. The cross section areas of the cooling medium supply side communicating hole 216 and from the cooling medium supply side communicating hole 217 were 10 $mm^2$.

Fuel cells of the Examples 5 to 7 and the Comparative Example 6 were produced by using the above separators. In this case, a gasket made of silicone rubber was disposed as a gas seal member, and 10 cells having the MEA and the separators were layered. The cooling medium was circulated in each cell. A stainless steel end plate was contacted with the outside of the fuel cell layered structure via a copper collecting plate plated with gold and an insulating plate, and a pressure of 151 $kgf/cm^2$ was applied to the ends thereof, so that the fuel cell was joined. After that, gas was supplied by a gas supplying system, and a load current obtained by the fuel cell was set. An electric output system was controlled, a fuel cell temperature was controlled, and a heat control system for using available exhaust heat was added.

The current density was 0.3 $\mu A/cm^2$. The supply gases were a pure hydrogen gas and an air. The used gas efficiency denotes the volume ratio of the gases used by electrode reaction with respect to the supplied gas. The used gas efficiency of the hydrogen gas was set 70%, and the used gas efficiency of the hydrogen gas was set to 40%. The continuous fuel tests were performed under the above conditions. In addition, the fuel cell temperature was 75 degrees C., the supplying pressure was 0.2 $kgf/cm^2$ on the air side and was 0.05 $kgf/cm^2$ on the hydrogen side, and the outlet pressure was in the air opened state. Twenty liters of ion-exchange water was used as the cooling medium, and had a conductivity of 1.5 $\mu S/cm$, and the continuously endurance running tests were performed for 2000 hours. After that, the conductivity of the cooling medium was measured. The results of the cooling medium tests are shown in Table 6.

TABLE 6

Conductivity of Cooling Medium of Each Separator After Power Generating Endurance Testing

| | Density of Cr on surface (mass %) | Conductivity of cooling medium (µS/cm) |
| --- | --- | --- |
| Example 5 | 12 | 3.9 |
| Example 6 | 16 | 4.1 |
| Example 7 | 25 | 4.2 |
| Comparative Example 6 | 32 | 30 |

As shown in Table 6, it is confirmed that in the fuel cells of the Examples 5 to 7, the increase in the cooling medium conductivity was inhibited in comparison with that in the Comparative Example 6. The metal analyses of the cooling medium after power generation were performed. As a result, in the Examples 5 to 7, releasing component elements did not generally occur, and release of Si used for the insulating coating occurred at a low level. In contrast, in the Comparative Example 6, the release of Cr and Ni occurred to a large degree, and the conductivity was increased due to release of metal components from the separator surface.

The present invention can be used as various kinds of power source in which it is necessary to maintain high power generation efficiency for a long period of time, and in particular can be used in many fields such as the automobile industry, the electrical apparatus industry, and the communications industry.

(3) Third Embodiment (A) Structure of Third Embodiment

Figure 7:
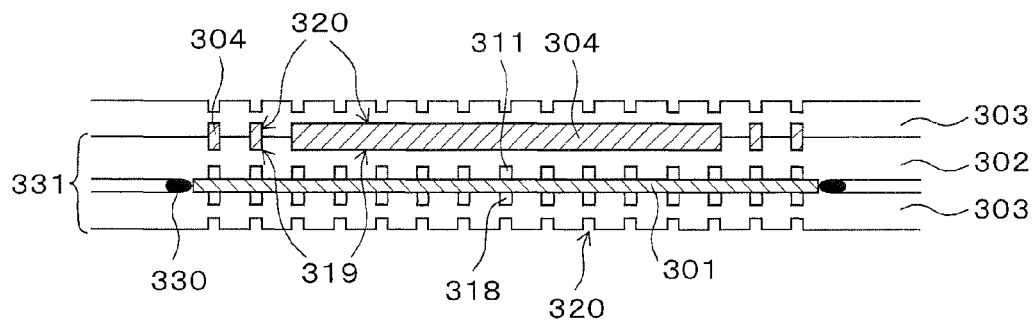
FIG. 7 is a cross sectional view showing a cross sectional structure of a unit power generation cell of the Third Embodiment.
Figure 8A:
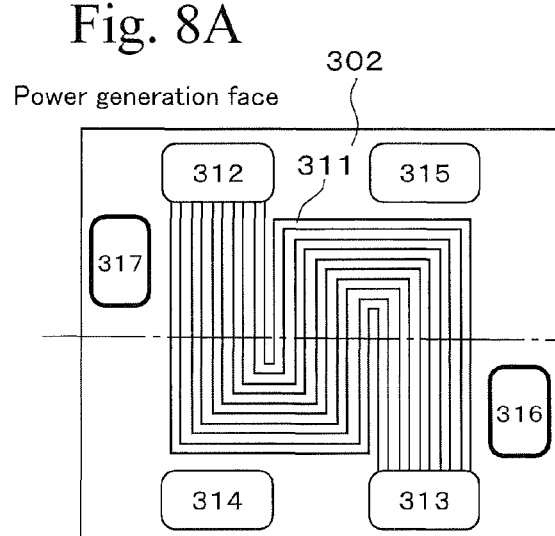
FIGS. 8A to 8D are plane views showing a structure of a separator.
Figure 8B:
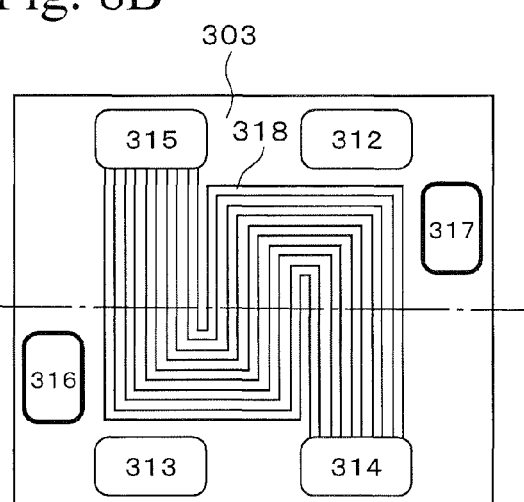
Figure 8C:
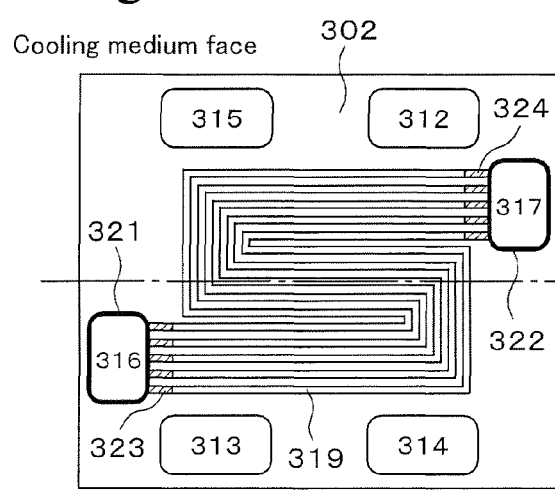
Figure 8D:
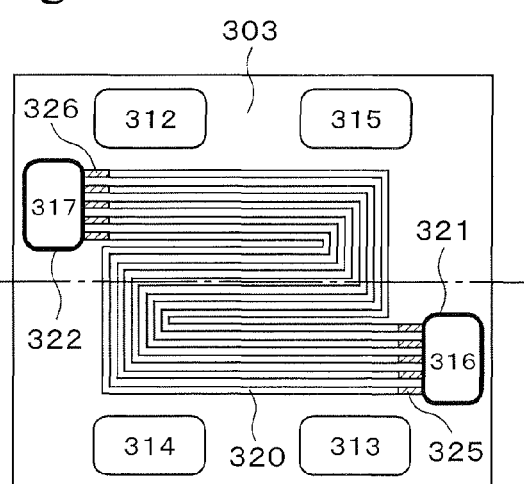

A schematic structure of the Third Embodiment will be described hereinafter. FIG. 7 is a cross sectional view showing a cross sectional structure of a unit power generation cell of the Third Embodiment. FIG. 8 is a plane view showing a structure of a separator. A unit power generation cell 331 has an anode side separator (a negative electrode side separator) 302, a cathode side separator (a positive electrode side separator) 303, and a MEA 301 disposed between the anode side separator 302 and the cathode side separator 303.

The MEA 301 has an electrolyte membrane and electrodes which are brought into contact with both sides of the electrolyte membrane. The MEA 301 is referred to as a membrane electrode joined body. FIG. 7 shows the unit power generation cell 331 and a cathode side separator 303 of a unit power generation cell adjacent to the unit power generation cell 331, which is stacked on the unit power generation cell 331. The fuel cell has a structure such that unit structures shown in FIG. 7 are repeatedly stacked so that a required voltage can be secured. Reference numeral 330 denotes a gasket for preventing a gas leak.

Grooves 311 for circulating a fuel gas containing hydrogen are formed on a power generation surface (a surface on a MEA side) of the anode side separator 302. Grooves 319 for circulating a cooling medium are formed on a cooling medium surface (a surface opposite to a MEA side) of the anode side separator 302. Grooves 318 for circulating a gas as an oxidant are formed on a power generation surface of the cathode side separator 303. Grooves 320 for circulating a cooling medium are formed on a cooling medium surface of the cathode side separator 303.

A cooling medium passage is formed by the grooves 319 of the unit power generation cell 331 and the grooves 320 of the unit power generation cell adjacent to the unit power generation cell 331, the grooves 319 and the grooves 320 being opposite to each other. The anode side separator 302 of the unit power generation cell 331 and the cathode side separator 303 of the unit power generation cell adjacent to the unit power generation cell 331 are cooled by a cooling medium circulated in the cooling medium passage 304.

Communicating holes 312 to 315 are formed in the anode side separator 302 and the cathode side separator 303. The communicating holes 312 to 315 penetrate cells in the structure in which unit power generation cells are stacked.

That is, as shown in FIGS. 8A to 8D, reference numeral 312 denotes a fuel gas supply communicating hole for supplying a fuel gas to the grooves 311 of the anode side separator 302 of each unit power generation cell in the structure in which many unit power generation cells 331 are layered. Reference numeral 313 denotes a fuel gas discharge communicating hole for collecting unburned fuel gas discharged from the groves 311 of the anode side separator 302 and discharging the collected unburned fuel gas outside the fuel cell in the structure in which many unit power generation cells 331 are stacked. Reference numeral 314 denotes an oxidation gas supply communicating hole for supplying an oxidation gas to the grooves 318 of the cathode side separator 303 of each unit power generation cell in the structure in which many unit power generation cells 331 are stacked. Reference numeral 315 denotes an oxidation gas discharge communicating hole for collecting non-reacted oxidation gas discharged from the groves 318 of the cathode side separator 303 and discharging the collected non-reacted oxidation gas outside the fuel cell in the structure in which many unit power generation cells 331 are stacked.

As shown in FIGS. 8A to 8D, reference numeral 316 denotes a cooling medium supply communicating hole for supplying a cooling medium to the grooves 319 of the anode side separator 302 of each unit power generation cell in the structure in which many unit power generation cells 331 are layered. Reference numeral 317 denotes a cooling medium discharge communicating hole for collecting cooling medium discharged from the groves 319 of the anode side separator 302 and discharging the collected cooling medium outside the fuel cell in the structure in which many unit power generation cells 331 are layered. The cooling medium supply communicating hole 316 has a structure such that a cooling medium is supplied to the grooves 320 on the cooling medium surface of the cathode separator 303, and the cooling medium discharge communicating hole 317 has a structure such that a cooling medium is collected from the grooves 320 in the cooling medium surface on the cathode separator 303.

An insulating coating 321 is formed at the overall inside of the cooling medium supply communicating hole 316. An insulating coating 322 is formed at the overall inside of the cooling medium discharge communicating hole 317.

On the cooling medium surface of the anode side separator 302, an insulating coating 323 is formed inside the grooves 319 at a cooling medium supply portion which is from the cooling medium supply communicating hole 316 to the groves 319 as the cooling medium passage. An insulating coating 324 is formed inside the grooves 319 at a cooling medium discharge portion which is from the groves 319 to the cooling medium discharge communicating hole 317. On the cooling medium surface of the cathode side separator 303, an insulating coating 325 is formed inside the grooves 320 at a cooling medium supply portion which is from the cooling medium supply communicating hole 316 to the groves 320 as the cooling medium passage. An insulating coating 326 is formed inside the grooves 320 at a cooling medium discharge portion which is from the groves 320 to the cooling medium discharge communicating hole 317. An insulating portion having a predetermined creeping distance is obtained by these insulating coatings.

Figure 9:
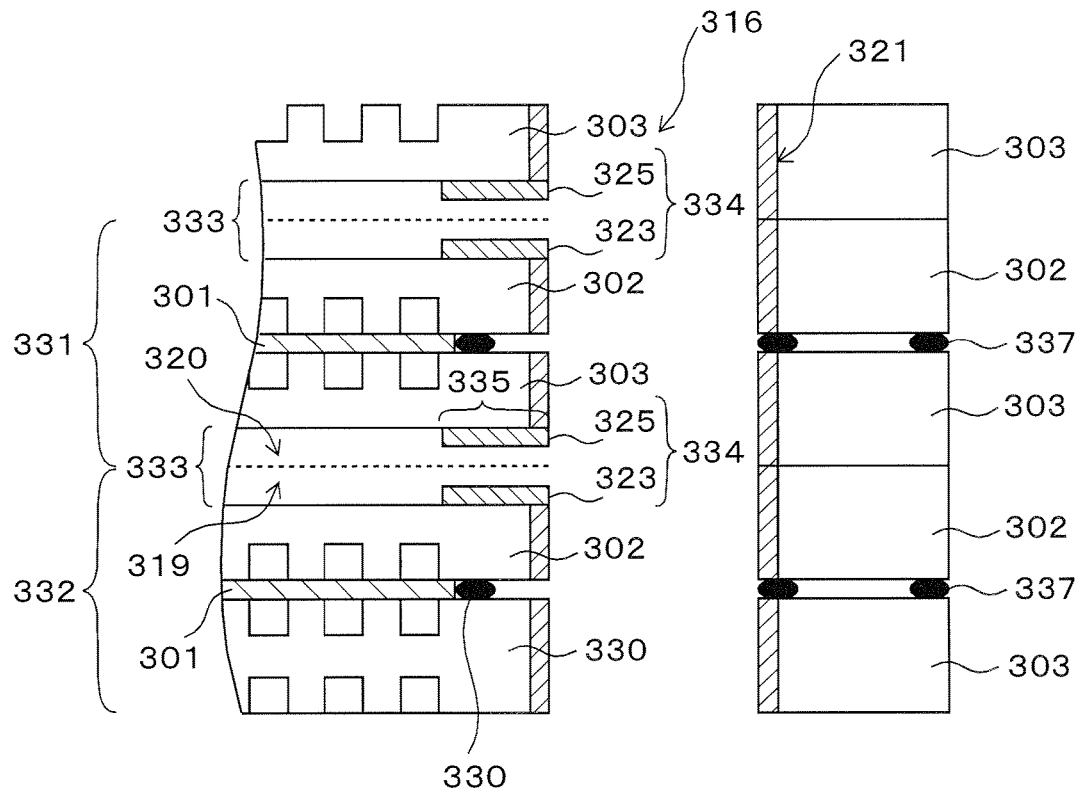
FIG. 9 is a cross sectional view showing a cross sectional structure in the vicinity of a cooling medium communicating hole in a structure having layered unit power generation cells.

The structure will be explained more in detail hereinafter. FIG. 9 is a view showing a cross section of a structure having two layered unit power generation cells. FIG. 9 is different from FIG. 7, and shows a local cross sectional structure of the cooling medium supply communicating hole 316.

FIG. 9 shows the unit power generation cells 331 and 332 having the same structure. As shown in FIG. 9, the cathode side separator 303 of the unit power generation cell 331 and the anode side separator 302 of the unit power generation cell 332 are brought into contact with each other. The cooling medium passage 333 is formed by the grooves 319, which is formed on the cooling medium surface of the cathode side separator 303 of the unit power generation cell 331, and the grooves 320, which are formed on the cooling medium surface of the anode side separator 302 of the unit power generation cell 332, the grooves 319 and 320 being opposite to each other. The insulating coating 321 is formed at the inside of the cooling medium supply communicating hole 316. The insulating coatings 323 and 325 are formed as the insulating portion 334 at the inside of the cooling medium supply portion (bridge portion) 335 which communicates from the cooling medium passage 333 to the cooling medium supply communicating hole 316. By forming the insulating coatings 323 and 325, the cooling medium supply portion 335 has the insulating portion 334 for electrically insulating the separator material from the cooling medium. Reference numeral 337 denotes a gasket for securing air-tightness.

In the Third Embodiment, although the overall cooling medium supply portion 335 is the insulating portion 334, the insulating portion 334 may be formed at one part of the cooling medium supply portion 335. The insulating portion may be divided into a greater number of plural parts.

(B) Production Example of Third Embodiment

A concrete example of processes and materials for producing the Third Embodiment will be described hereinafter.
(Production Process of MEA 301)
A MEA 301 is produced in the same manner as in the examples of the Second Embodiment.
(Production Process for Separator)
Next, a production process for an anode side separator 302 and a cathode side separator 303 will be described. An example, in which an anode side separator 302 and a cathode side separator 303 are produced by using the same materials, will be described hereinafter. A stainless steel plate, having a composition shown in Table 2 of the First Embodiment and a thickness of 0.2 mm, and was subjected to press working. As a result, the anode side separator 302 and the cathode side separator 303 having a shape shown in FIG. 8 were obtained.

Next, coatings were formed at the insides (portions contacting with cooling medium) of a cooling medium supply communicating hole 316 and of a cooling medium discharge communicating hole 317. Coatings were formed at the groove insides of a cooling medium supply portion and a cooling medium supply portion. The coatings had a thickness of 0.5 mm and were made of a silicone rubber. Electrical insulating characteristics between a separator material and a cooling medium were secured by the above coatings. The coating made of silicone rubber was used for a cooling medium supply portion 335 shown in FIG. 9 as an insulating portion. A cooling medium discharge portion (not shown) having the same structure as the cooling medium supply portion was as an insulating portion.
(Production Process for Fuel Cell)
First, the MEA was subjected to cutting so as to have an electrode area of 200 cm$^2$. Next, a gasket (corresponding to reference numeral 330 in FIGS. 7 and 9) made of silicone was disposed as a gas sealing member around the MEA machined so as to have a predetermined size, and in this state the MEA was held by the anode side separator (corresponding to reference numeral 302 in FIG. 7) and the cathode side separator (corresponding to reference numeral 303 in FIG. 7) as a unit power generation cell. A layered structure was obtained such that 100 cells obtained in the above manner were layered. Next, copper collecting plates were disposed at both sides of the layered structure, a pair of stainless steel plates were disposed there outside via an insulating member, and the two stainless steel plates were fastened by bolts at a pressure of 15 kg/cm$^2$, so that a fuel cell was obtained.

(C) Test of Fuel Cell

In the fuel cells produced in the above manner, various combinations of cross sectional areas of the cooling medium supply communicating hole and the cooling medium discharge communicating hole, lengths (creeping distances) of the cooling medium supply portion and the cooling medium discharge portion, and a conductivity of the cooling medium were prepared as shown in Table 7. Endurance tests were performed for 1000 hours.

TABLE 7

| | | Cooling medium communicating hole | | Cooling medium supply portion and cooling medium discharge portion | | |
|---|---|---|---|---|---|---|
| | Conductivity of cooling medium (μS/cm) | Cell thickness (mm) | Communicating hole cross sectional area (cm²) | Conversion liquid resistance (kΩ) | Creeping Distance (mm) | Inlet cross sectional area (mm²) | Conversion liquid resistance (MΩ) |
| Example A1 | 5.0 | 2 | 6.7 | 6.0 | 0.8 | 8.3 | 0.2 |
| Example A2 | 2.0 | 2 | 6.7 | 15 | 0.8 | 8.3 | 0.5 |
| Example A3 | 1.0 | 2 | 6.7 | 30 | 0.8 | 8.3 | 1.0 |
| Example A4 | 5.0 | 2 | 13.3 | 3.0 | 2.1 | 8.3 | 0.5 |
| Example A5 | 2.0 | 2 | 13.3 | 7.5 | 2.1 | 8.3 | 1.3 |
| Example A6 | 10 | 2 | 13.3 | 1.5 | 12.5 | 8.3 | 1.5 |
| Example A7 | 5.0 | 2 | 13.3 | 3.0 | 12.5 | 8.3 | 3.0 |
| Example A8 | 2.0 | 2 | 13.3 | 7.5 | 12.5 | 8.3 | 7.5 |
| Example A9 | 1.0 | 2 | 13.3 | 15 | 12.5 | 8.3 | 15 |
| Comparative Example B1 | 30 | 2 | 13.3 | 0.5 | 12.5 | 8.3 | 0.5 |
| Comparative Example B2 | 5.0 | 2 | 13.3 | 3.0 | 0 | 8.3 | 0 |
| Comparative Example B3 | 15 | 2 | 6.7 | 2.0 | 0.8 | 8.3 | 0.07 |

The endurance tests were performed using a highly pure hydrogen gas as a fuel gas and an air as an oxidation gas. The supply pressure of the hydrogen gas was 0.1 kgf/cm², the discharge side thereof was open-air, the supply pressure of the air gas was 0.05 kgf/cm², and the discharge side thereof was open-air. The used gas efficiency of the hydrogen gas was set 70%, and the used gas efficiency of the hydrogen gas was set 40%. A total of 20 liters of ethylene glycol solution of 20 L which had a conductivity shown in Table 7 was used and circulated as the cooling medium. The cooling medium was cooled by a heat exchanger. The cooling efficiency and the circulating speed were controlled, so that the fuel cell temperature during operation was maintained at 75 degrees C.

The gas efficiency is an index indicating a ratio of gas used for electrode reaction in the case in which the current density of generated electrical power is 0.3 A/cm²

In Table 7, the conversion resistance in the cooling medium communicating hole is a liquid resistance for one cell length of one communicating hole. The number of the disposed communication holes is two for supply and discharge. The liquid resistance for one cell is an electrical resistance of the cooling medium in the communicating hole at a size in a thickness direction of unit power generation cells 331 and 332 as shown in FIG. 9. The conversion resistance in the cooling medium communicating hole is calculated based on the initial conductivity of the cooling medium, the cross section area of the communicating hole, and the cell thickness.

The conversion resistance is the sum of the liquid resistance of the cooling medium in the cooling medium supply portion (corresponding to reference numeral 335 in FIG. 9) and the liquid resistance of the cooling medium in the cooling medium discharge portion. The conversion resistances of the cooling medium supply portion and the cooling medium discharge portion are calculated based on the initial conductivity of the cooling medium, the cross section areas of the cooling medium supply portion and the cooling medium discharge portion, and lengths (creeping distances) of the cooling medium supply portion and the cooling medium discharge portion. The cooling medium discharge portion provided at the other side of the cooling medium passage of the separator had the same structure and the structure size as the cooling medium supply portion. The conductivities before and after the endurance tests performed under the above conditions are shown in Table 8.

TABLE 8

| | Initial cooling medium conductivity (μS/cm) | Cooling medium conductivity after endurance testing (μS/cm) | Cooling medium conductivity beforer endurance testing (μS/cm) |
|---|---|---|---|
| Example A1 | 5.0 | 7.4 | 48 |
| Example A2 | 2.0 | 2.8 | 40 |
| Example A3 | 1.0 | 1.8 | 80 |
| Example A4 | 5.0 | 6.8 | 36 |
| Example A5 | 2.0 | 2.5 | 25 |
| Example A6 | 10 | 14 | 40 |
| Example A7 | 5.0 | 5.9 | 18 |
| Example A8 | 2.0 | 2.5 | 25 |
| Example A9 | 1.0 | 1.5 | 50 |
| Comparative Example B1 | 30 | 100 | 233 |
| Comparative Example B2 | 5.0 | 120 | 2300 |
| Comparative Example B3 | 15 | 110 | 633 |

As shown in Tables 7 and 8, in the case in which the insulating portion is not provided at the separator, that is, in the case in which the cooling medium supply portion and the cooling medium discharge portion which have insulating coatings are not provided, the conductivity increased remarkably after endurance tests. This is because inhibiting effects by the insulating portions were not obtained. Assuming that reference symbol A denotes the conductivity before the endurance test of the cooling medium and reference symbol B denotes the conductivity after the endurance test of the cooling medium, the increase rate of the cooling medium conductivity is calculated based on the expression $$((B/A)-1) \times 100.$$

On the other hand, when the liquid resistances of the cooling medium supply portion and the cooling medium discharge portion are about 0.2MΩ, it is confirmed that the increase rate of the cooling medium conductivity is substantially inhibited. As a result, the effect of providing the cooling medium supply portion and the cooling medium discharge portion which have insulating coatings is confirmed.

It is confirmed that as the liquid resistances of the cooling medium supply portion and the cooling medium discharge portion increase, the increase rate of the cooling medium conductivity decreases. The increase rate of the cooling medium conductivity of the Example A9 is relatively large since the initial conductivity is small and the influence of the conductivity increase due to factors other than corrosion of the separator material is thereby strong.

As shown in Tables 7 and 8, it is confirmed that the effect is obtained by controlling the cross section areas of the cooling medium communicating holes and using the liquid resistance of the cooling medium communicating hole for each cell. For example, in comparison of the Example A2 and the Comparative Example B1, although the both liquid resistance of the cooling medium supply portion and the cooling medium discharge portion are the same, the increase rate of the cooling medium conductivity of the Comparative Example B1 is more than four times as large as in the Example A2. Although in the Example A2 the influence of the conductivity increase due to factors other than corrosion is large since the initial conductivity is small and the Example A2 is thereby more disadvantageous than the Comparative Example B1, the increase rate of the cooling medium conductivity of the Example A1 is not less than ¼ times as large as in the comparative Example B1. This is because the liquid resistance of the cooling medium communicating hole for each cell of the Example A1 was 30 times as large as that of the comparative Example B1.

(D) Analysis by Equivalent Circuit

Figure 10:
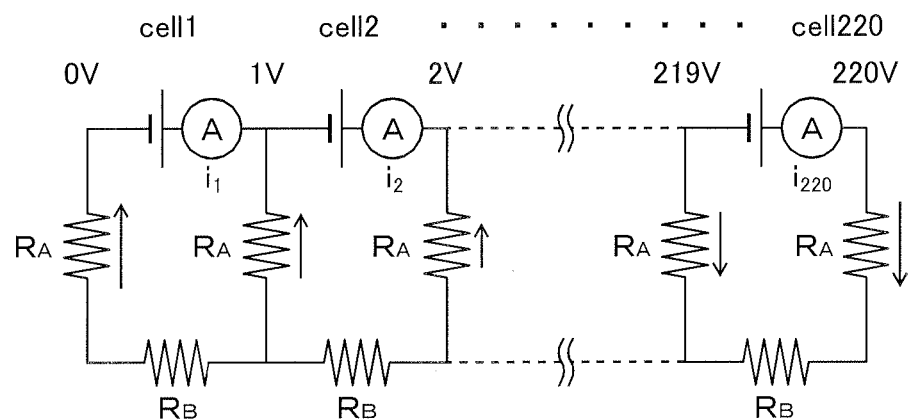
FIG. 10 is an equivalent circuit diagram showing a current passage in which a cooling medium flows.

The corrosion current flowing via the cooling medium of the fuel cell having the fundamental structure shown in FIGS. 7 to 9 will be analyzed below. FIG. 10 is an equivalent circuit diagram focusing on the cooling medium of the fuel cell of the Third Embodiment. The example shown in FIG. 10 is an example in which 220 unit power generation cells enable generating a voltage of 1V are stacked in series.

In the equivalent circuit shown in FIG. 10, reference symbol $R_A$ denotes the sum of the liquid resistances of the cooling medium supply portion and the cooling medium discharge portion formed at both ends of the cooling medium passage. Reference symbol $R_B$ denotes the liquid resistance for one cell of the cooling medium supply communicating hole.

Figure 11:
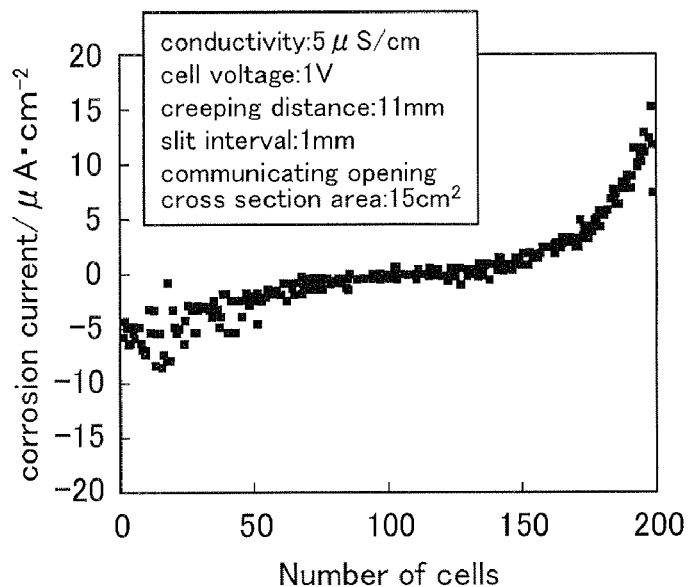
FIG. 11 is a data plot diagram showing a relationship of positions of layered cells and a corrosion current.

FIG. 11 is a data plot diagram showing a relationship of positions of layered cells in the case in which $R_B$ is zero in the equivalent circuit in FIG. 10 and a corrosion current.

As shown in FIG. 11, in the structure in which many cells are layered, corrosion prevention current flows in the cooling medium passage at the lower potential side cell (cell 1 or cells adjacent to the cell 1), and corrosion current flows in the cooling medium passage at the higher potential side cell (cell 220 or cells adjacent to the cell 220).

Figure 12:
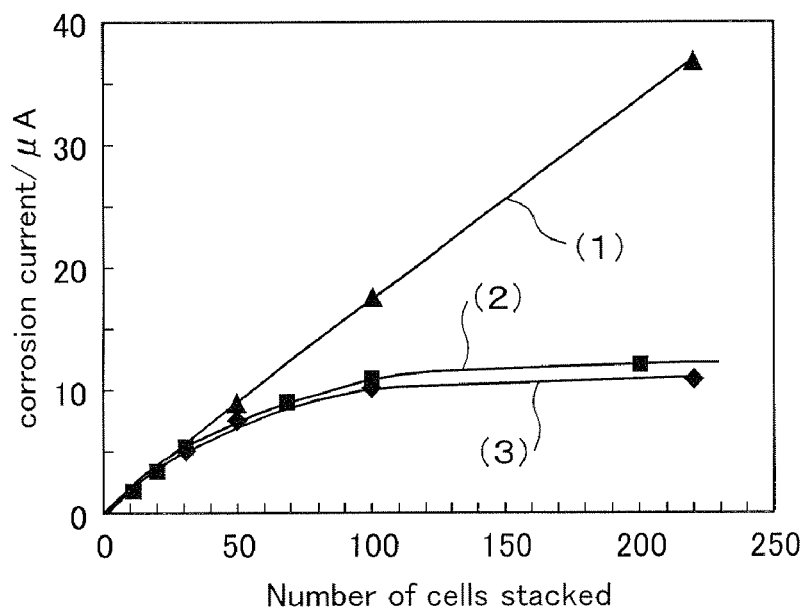
FIG. 12 is a diagram showing the relationship of stacked number of cells and a corrosion current flowing in a fuel cell.

FIG. 12 is a diagram showing a relationship of the number of stacked cells and the corrosion current flowing in the fuel cell. In FIG. 12, Data (1) is a simulation data of the relationship of the number of the layered cells and the corrosion current flowing between the positive electrode and the negative electrode which is calculated based on the equivalent circuit model shown in FIG. 10 assuming that the insulating coating is not formed at the cooling medium communicating holes (cooling medium supply communicating hole and the cooling medium discharge communicating hole) in the fuel cell having the unit power generation cells of the Example A7 in Table 7.

The Data (2) is measured data of the relationship of the number of the layered cells and the sum of the corrosion current flowing in the fuel cell having the unit power generation cells of the Example A7 in Table 7.

The Data (3) is simulation data of the relationship of the number of the layered cells and the sum of the corrosion current flowing in the fuel cell having the unit power generation cells of the Example A7 in Table 7, which is based on the equivalent circuit model shown in FIG. 10.

As shown in FIG. 12, the corrosion current flowing in the fuel cell can be substantially inhibited by forming insulating coatings in the cooling medium communicating hole. In particular, when the number of the stacked cells exceeds about 50, the inhibiting effect is prominent, and when the number of the stacked cells exceeds 100, the inhibiting effect is extremely prominent. Since the measured Data (2) and the simulation Data (3) precisely correspond to each other, the validity of the equivalent circuit is confirmed.

The utility of electrically insulating the inside surface of the cooling medium communicating hole piercing each cell from the cooling medium can be explained by using the equivalent circuit shown in FIG. 10. That is, the corrosion current is generated by the potential difference integrated with the voltage of 1V applied to each layered cell. For example, the integrated potential difference is 220V at maximum in the case of the model in FIG. 10. When there is not $R_B$ and there is $R_A$ only, the $R_A$ is the load of the potential difference, so that the larger corrosion current flows in comparison with the case in which there is also $R_B$. In contrast, when there is $R_B$ to some degree, the $R_B$ is also the load of the potential difference, so that the voltage applied by the liquid resistance due to the $R_B$ is divided, and the potential applied to the separator portion which is not electrically insulated is small. As a result, the corrosion current flowing in the separator portion which is not electrically insulated can be inhibited.

In particular, if the number of the layered cells is large, the value integrated with the $R_B$ and the number of the layered cells has a strong influence even when the $R_B$ is small, so that the generation of the corrosion current at the higher potential sides of cell can be substantially inhibited. It is confirmed that the effect obtained by providing the $R_B$ is remarkable when the number of the layered cells is larger to some extent.

The actions and effects obtained by providing the $R_B$ will be explained hereinafter. The data shown in Table 9 is obtained by readjusting the data shown in Tables 7 and 8.

TABLE 9

| | Cooling medium communicating hole Conversion liquid resistance of both ends R1 (MΩ) | Cooling medium supply and discharge portions Conversion liquid Resistance R2 (MΩ) | R1/R2 | Increase ratio of cooling medium conductivity |
|---|---|---|---|---|
| Example A1 | 0.6 | 0.2 | 3.0 | 48 |
| Example A2 | 1.5 | 0.5 | 3.0 | 40 |
| Example A3 | 3.0 | 1.0 | 3.0 | 80 |
| Example A4 | 0.3 | 0.5 | 0.6 | 36 |
| Example A5 | 0.75 | 1.3 | 0.6 | 25 |
| Example A6 | 0.15 | 1.5 | 0.1 | 40 |
| Example A7 | 0.3 | 3.0 | 0.1 | 18 |
| Example A8 | 0.75 | 7.5 | 0.1 | 25 |
| Example A9 | 0.15 | 15 | 0.1 | 50 |

TABLE 9-continued

| | Cooling medium communicating hole Conversion liquid resistance of both ends R1 (MΩ) | Cooling medium supply and discharge portions Conversion liquid Resistance R2 (MΩ) | R1/R2 | Increase ratio of cooling medium conductivity |
|---|---|---|---|---|
| Comparative Example B1 | 0.05 | 0.5 | 0.1 | 233 |
| Comparative Example B2 | 0.3 | 0 | — | 2300 |
| Comparative Example B3 | 0.2 | 0.07 | 2.9 | 633 |

In Table 9, the conversion liquid resistance between both ends is the value integrated with the resistance values for one cell of the cooling medium communicating holes in the overall fuel cell in the structure of the cooling medium communicating holes piecing the many (in this case, 100) stacked cells. For example, the liquid resistance for one cell of the cooling medium communicating hole is the $R_B$, and when the number of the stacked cells is 220, the expression R1=220× $R_B$ is obtained.

As shown in Table 9, if the liquid resistance of the cooling medium communicating hole for one cell is small, in a fuel cell having stacked plural cells, the integrated liquid resistance of the communicating hole is almost equal to that of the insulating portion of the separator portion.

As shown in Table 9, when the liquid resistance between the both ends of the communicating holes in the fuel cell is almost equal to that of the insulating portion of the separator portion, the effect of insulating the communicating hole and maintaining the liquid resistance is remarkably obtained.

As shown in Table 9, when the relationship of the liquid resistance R1 between the ends of the cooling medium supply communicating hole and the liquid resistance R2 at the insulating portion, that is, the relationship (R1/R2) is about 0.1 to 3, whereby the conductivity of the cooling medium can be inhibited.

In the Comparative Examples B1 and B2, the relationship (R1/R2) is 0.1 to 3. However, in the Comparative Example B1, the liquid resistance of the cooling medium communicating hole is 0.5 kΩ which is excessively small, so that as shown in Table 8, the increase in conductivity of the cooling medium before and after the endurance test is large, and the Comparative Example B1 is not desirable. In the Comparative Example B1, the liquid resistance of the cooling is reduced by setting the initial resistance of the cooling medium at a larger value, for example, 30 μS/cm, so that the Comparative Example B1 is not desirable since the insulating characteristic of the cooling medium is sacrificed.

In the Comparative Example B3, the liquid resistance of the cooling medium supply portion and the cooling medium discharge portion is excessively small, and the Comparative Example B3 is not desirable since the initial conductivity of the cooling medium is excessively large so that it is not allowable.

The present invention can applied to fuel cells for inhibiting the decrease in the performance due to corrosion of separators. Fuel cells to which the present invention is applied can be compact, light weight, and high efficiency, and can reduce cost. In addition, in the above fuel cells, the decrease in performance is small. It is desirable that the above fuel cells be used as energy sources of motor-driven automobiles. The present invention can be used as various electrical energy generation sources.

What is claimed is:

1. A fuel cell comprising:
   a unit power generation cell having a separator with a cooling medium passage formed on a surface of the separator;
   cooling medium communicating holes for supplying a cooling medium and for discharging a cooling medium, the cooling medium communicating holes penetrating the unit power generation cell and having an insulating coating formed inside the cooling medium communicating holes;
   a cooling medium supply portion for supplying a cooling medium from the cooling medium communicating hole for supplying a cooling medium to the cooling medium passage;
   a cooling medium discharge portion for discharging a cooling medium from the cooling medium passage to the cooling medium communicating hole for discharging a cooling medium; and
   an insulating portion providing at least one of the cooling medium supply portion and the cooling medium discharge portion, the insulating portion having an insulating coating formed adjacent to one of the cooling medium communicating hole for supplying a cooling medium and the cooling medium communicating hole for discharging a cooling medium,
   wherein the cooling medium communicating hole for supplying a cooling medium has a liquid resistance from 1.5 to 30 kΩ per unit power generation cell, and the insulating portion has a liquid resistance of from 0.2 to 15 MΩ.

2. The fuel cell according to claim 1, wherein the cooling medium has a conductivity of not more than 10 μS/cm.

3. The fuel cell according to claim 1, wherein not less than 50 power generation cell units are layered.

* * * * *